(12) United States Patent
Bachmann et al.

(10) Patent No.: US 8,792,453 B2
(45) Date of Patent: Jul. 29, 2014

(54) SECURE TUNNEL ESTABLISHMENT UPON ATTACHMENT OR HANDOVER TO AN ACCESS NETWORK

(75) Inventors: Jens Bachmann, Langen (DE); Shinkichi Ikeda, Osaka (JP); Takashi Aramaki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 251 days.

(21) Appl. No.: 13/126,924

(22) PCT Filed: Oct. 28, 2009

(86) PCT No.: PCT/EP2009/007715
§ 371 (c)(1),
(2), (4) Date: Jul. 18, 2011

(87) PCT Pub. No.: WO2010/063348
PCT Pub. Date: Jun. 10, 2010

(65) Prior Publication Data
US 2011/0261787 A1    Oct. 27, 2011

(30) Foreign Application Priority Data

Dec. 3, 2008 (EP) .................................. 08020986

(51) Int. Cl.
*H04W 36/00* (2009.01)
*H04L 29/06* (2006.01)
*H04W 80/04* (2009.01)
*H04W 76/02* (2009.01)

(52) U.S. Cl.
CPC ......... *H04L 63/029* (2013.01); *H04W 36/0038* (2013.01); *H04W 80/04* (2013.01); *H04W 76/022* (2013.01)
USPC ........................................................ 370/331

(58) Field of Classification Search
CPC ... H04W 84/045; H04W 48/16; H04W 12/08; H04W 48/08; H04W 48/20; H04W 4/02; H04W 12/02; H04W 80/04; H04W 88/16; H04W 84/105; H04W 92/02; H04W 12/06; H04W 12/12; H04W 36/0033; H04W 36/0066
USPC ........................... 370/254–340; 709/201–213
See application file for complete search history.

(56) References Cited

U.S. PATENT DOCUMENTS 7,983,229 B2 * 7/2011 Bachmann et al. ........... 370/338
8,031,672 B2 * 10/2011 Balaji et al. ................... 370/331

(Continued)

FOREIGN PATENT DOCUMENTS

EP    1 638 261    3/2006
JP    2006/229831    8/2006

(Continued)

OTHER PUBLICATIONS

Japanese Notice of Reasons for Rejection dated Dec. 24, 2013 with English Translation.

(Continued)

*Primary Examiner* — Ayaz Sheikh
*Assistant Examiner* — Debebe Asefa
(74) *Attorney, Agent, or Firm* — Dickinson Wright PLLC

(57) ABSTRACT

The invention relates to a method, mobile node and computer-readable medium for establishing (or pre-establishing) a secure tunnel to an ePDG to prepare for a mobile node attachment or handover to another access network. To reduce the delay of a handover or upon attachment of a mobile node to an access network implied by mechanisms to discover a ePDG, the mobile node maintains a reachability list that can be consulted to identify an ePDG or ePDGs that are reachable in the target access network, i.e. to which the mobile node may establish a secure tunnel. If the mobile node can identify a reachable ePDG for a given access network from the reachability list, the mobile node (pre-)establishes a secure tunnel to the ePDG upon attaching to the given access network. In alternative solutions DNS, DHCP or other mechanism can be used to provide the mobile node with information on ePDGs in its vicinity.

26 Claims, 14 Drawing Sheets

(56) References Cited

U.S. PATENT DOCUMENTS

| | | | |
|---|---|---|---|
| 8,204,034 B2* | 6/2012 | Ahuja et al. | 370/349 |
| 8,582,567 B2* | 11/2013 | Kurapati et al. | 370/356 |
| 8,607,309 B2* | 12/2013 | Ropolyi et al. | 726/3 |
| 2005/0254652 A1* | 11/2005 | Engler et al. | 380/270 |
| 2010/0074179 A1 | 3/2010 | Akiyoshi | |

FOREIGN PATENT DOCUMENTS

| | | |
|---|---|---|
| WO | 2006/137037 | 12/2006 |
| WO | 2007/043117 | 4/2007 |
| WO | 2008/099857 | 8/2008 |

OTHER PUBLICATIONS

3GPP TSG SA WG3 Security—S3#34, "Clarification on Addresses used for Tunnel Establishment", S3-040459, Jul. 6-9, 2004, one page total.

International Search Report dated Apr. 6, 2010.

European Search Report dated Oct. 14, 2009.

3GPP TS 23.402 V8.1.1, "3rd Generation Partnership Project; Technical Specification Group Services and System Aspects; Architecture enhancements for non-3GPP accesses (Release 8)," Mar. 2008, pp. 1-163.

J. Shin, et al., "Gateway Discovery and Routing in Ad Hoc Networks with NAT-based Internet Connectivity," IEEE 60th Vehicular Technology Conference, Sep. 26-29, 2004, pp. 2883-2886.

P. Eronen, "IKEv2 Mobility and Multihoming Protocol (MOBIKE)," Internet Engineering Test Force Standard, RFC 4555, Jun. 1, 2006, pp. 1-33.

3GPP TS 23.401 V8.3.0, "General Packet Radio Service (GPRS) enhancements for Evolved Universal Terrestrial Radio Access Network (E-UTRAN) access (Release 8)," Sep. 2009, pp. 1-38.

3GPP TS 23.402 V8.3.0, "3rd Generation Partnership Project; Technical Specification Group Services and System Aspects; Architecture enhancements for non-3GPP accesses (Release 8)," Sep. 2008, pp. 1-190.

D. Johnson et al., "Mobility Support in IPv6," IETF RFC 3775, Jun. 2004, pp. 1-165.

H. Soliman et al., "Mobile IPv6 Support for Dual Stack Hosts and Routers," IETF Internet Draft, draft-ietf-mext-nemo-v4traversal-06. txt, Nov. 3, 2008, pp. 1-50.

S. Gundavelli et al., "Proxy Mobile IPv6," IETF RFC 5213, Aug. 2008, pp. 1-92.

K. Leung et al., "WiMAX Forum/3GPP2 Proxy Mobile IPv4," IETF Internet Draft, draft-leung-mip4-proxy-mode-09.txt, Jul. 31, 2008, pp. 1-42.

S. Kent et al, "Security Architecture for the Internet Protocol," IETF RFC 4301, Dec. 2005, pp. 1-101.

3GPP TS 23.234 V7.7.0, "3rd Generation Partnership Project; Technical Specification Group Services and System Aspects; 3gpp system to Wireless Local Area Network (LAN) interworking; System description (Release 7)," Jun. 2008, pp. 1-85.

C. Kaufman, "Internet Key Exchange (IKEv2) Protocol," IETF RFC 4306, Dec. 2005, pp. 1-99.

* cited by examiner

SECURE TUNNEL ESTABLISHMENT UPON ATTACHMENT OR HANDOVER TO AN ACCESS NETWORK

FIELD OF THE INVENTION

The invention relates to a method, mobile node and computer-readable medium for establishing (or pre-establishing) a secure tunnel to a trusted packet data gateway to prepare for a mobile node attachment or handover to another access network. Furthermore, the invention also relates to a mobile communication system where the methods and mobile nodes can be used. The invention also related to nodes in the core network (PLMN) that support the mobile node, e.g. by means of providing information on ePDGs reachable within the vicinity of the mobile node or supporting the mobile node when attaching to a new access.

TECHNICAL BACKGROUND

UMTS (Universal Mobile Telecommunications System) is the 3G (3rd Generation) mobile communication system standardized by 3GPP (3rd Generation Partnership Project). The 3GPP launched a study item "Evolved UTRA and UTRAN" better known as "Long Term Evolution (LTE)". The study investigates means of achieving major leaps in performance in order to improve service provisioning, and to reduce user and operator costs. In view of these studies and in order to enable interworking with other radio access technologies, the need arose for the definition of a new Evolved Packet Core (EPC) network. For further details, please see 3GPP TS 23.401, "General Packet Radio Service (GPRS) enhancements for Evolved Universal Terrestrial Radio Access Network (E-UTRAN) access", version 8.3.0 and 3GPP TS 23.402, "Architecture enhancements for non-3GPP accesses", version 8.3.0, both documents available at http://www.3gpp.org and incorporated herein by reference.

An exemplary representation of the E-UTRAN architecture of LTE is shown in FIG. 1. In the following, the most important entities in this architecture are explained to facilitate a better understanding of the invention described herein.

The E-UTRAN consists of evolved Node Bs (eNBs or eNode Bs), providing the E-UTRA user plane (PDCP/RLC/MAC/PHY) and control plane (RRC) protocol terminations towards the mobile node. The eNodeB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers.

The eNode Bs are interconnected with each other by means of the X2 interface. The eNode Bs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNode Bs.

The Serving Gateway routes and forwards user data packets, while also acting as the mobility anchor for the user plane during inter-eNodeB handovers and as the anchor for mobility between LTE and other 3GPP technologies (terminating the S4 interface and relaying the traffic between 2G/3G systems and PDN-GW). For idle state UEs, the Serving Gateway terminates the downlink data path and triggers paging when downlink data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the Serving Gateway for a UE at the initial attach and at time of intra-LTE handover involving Core Network (CN) node relocation. It is responsible for authenticating the user (by interacting with the Home Subscriber Server, HSS). It checks the authorization of the UE to camp on the service provider's Public Land Mobile Network (PLMN) and enforces UE roaming restrictions. The MME is the termination point in the network for ciphering/integrity protection for Non-Access Stratum (NAS) signaling and handles the security key management. The MME also provides the control plane function for mobility between LTE and 2G/3G access networks with the S3 interface terminating at the MME from the SGSN (Serving GPRS Support Node). The MME also terminates the S6a interface towards the home HSS for roaming UEs.

The Packet Data Network Gateway (PDN-GW) provides connectivity for the UE to external packet data networks by being the point of exit and entry of traffic for the UE. A UE may have simultaneous connectivity with more than one Packet Data Network Gateway for accessing multiple Packet Data Networks (PDNs). The Packet Data Network Gateway performs policy enforcement, packet filtering for each user, charging support, lawful Interception and packet screening. Another key role of the Packet Data Network Gateway is to act as the anchor for mobility between 3GPP and non-3GPP technologies.

To summarize the architecture depicted in FIG. 1, the new 3GPP Core Network is mainly separated into three logical entities in order to support the new E-UTRAN access. In the user plane, the Packet Data Network Gateway (PDN-GW) is the gateway to the external networks and the global mobility anchor for mobility between 3GPP and non-3GPP access technologies (for example, COMA 2000, WiMAX or WIFI). Also in the user plane, the Serving Gateway can be considered the mobility anchor for mobility between 3GPP accesses (E-UTRAN, UTRAN, GERAN). The Mobility Management Entity (MME) is the control plane entity responsible for the mobility management of UEs (also referred to in the following as mobile terminals, mobile nodes or MNs) moving between different E-UTRAN base stations (eNode Bs) and for the session management.

Another aspect of LTE is the support of 3GPP accesses (e.g. GERAN, UTRAN, E-UTRAN), non-3GPP accesses (e.g. WLAN, WiMAX, 3GPP2, etc.) and mobility between those different types of access, i.e. in a heterogeneous network. The anchor for the mobility between the 3GPP and the non-3GPP accesses is a Packet Data Network Gateway that also provides the interface to the external Packet Data Networks. The mobility between 3GPP and non-3GPP accesses is based on Mobile IP—the protocol used can be either Client Mobile IP (see Johnson et al., "Mobility Support in IPv6", IETF RFC 3775, June 2004 and Soliman et al., "Mobile IP6 Support for Dual Stack Hosts and Routers", IETF Internet Draft, draft-ietf-mext-neuro-v4traversal-06.txt, November 2008, both documents available at http://www.ietf.org and incorporated herein by reference) or Proxy Mobile IP (see Gundavelli et al., "Proxy Mobile IPv6", IETF RFC 5213, August 2008 and Leung et at, "WiMAX Forum/3GPP2 Proxy Mobile IPv4", IETF Internet Draft, draft-leung-mip4-proxy-mode-09.txt, July 2008, both documents available at http://www.ietf.org and incorporated herein by reference).

The non-3GPP accesses (access networks) can be classified into trusted access networks and untrusted access networks. The assumption for untrusted access networks is that a UE in an untrusted access network first needs to establish a secure tunnel (based on IPsec—see Kent et al, "Security Architecture for the Internet Protocol", IETF RFC 4301, December 2005, available at http://www.ietf.org and incorporated herein by reference) to an evolved Packet Data Gateway (ePDG) before being able to access operator services, i.e. the PDN. The ePDG is similar to the PDG used for Interworking WLAN (see 3GPP TS 23.234, "3GPP system to Wireless Local Area Network (WLAN) interworking; System description", version 7.7.0, available at http://www.3gpp.org and incorporated herein by reference). In trusted accesses no secure tunnel is needed, instead the PDN-GW may be directly accessed from the UE.

For mobility within the same or between different non-3GPP accesses similar mechanisms can be used as for mobility between 3GPP and non-3GPP accesses, i.e. Client or Proxy Mobile IP.

When a UE is connected to a network, it has connectivity to at least one Packet Data Network and may be also connected to multiple Packet Data Network s concurrently. Possible PDNs are for example the public internet, corporate network, IMS/SMS network.

When a UE, connected to at least one Packet Data Network, wants to perform a handover to an untrusted non-3GPP access network the UE must first discover an ePDG from the non-3GPP access using the allocated local IP address. For this, the UE discovers/selects an ePDG by either static configuration in the UE or dynamically. With dynamic discovery if the UE roams in a VPLMN (Visited Public Land Mobile Network), it constructs an FQDN (Fully Qualified Domain Name) using the VPLMN ID and requests the DNS system. Otherwise, the UE constructs an FQDN using the HPLMN ID (HPLMN=Home Public Land Mobile Network) and uses a DNS query to resolve an ePDG address. Subsequently, the UE selects an ePDG address from the list returned and initiates IKE/IPSec tunnel establishment (see Kaufman, "Internet Key Exchange (IKEv2) Protocol", IETF RFC 4306, December 2005; available at http://www.ietf.org and incorporated herein by reference) to this ePDG. If the IKE/IPsec tunnel is set up, the UE can send and receive user data for the PDN connection. However, the IKEv2/IPsec tunnel establishment is quite time consuming because of the key creation. Therefore, in order to allow faster handover to the untrusted non-3GPP accesses, the UE should discover the ePDG and establish the secure tunnel before doing the handover using the existing connection to a Packet Data Network and the associated home IP address.

Depending on the network configuration, there can be several candidate ePDGs the UE may connect to in advance, but some of them may not be reachable from a new access or may not be optimal in sense of routing efficiency. Therefore, in order to avoid maintaining states to several ePDGs for a long time, the UE should pre-establish the IKE/IPSec tunnel with the ePDG shortly before the handover to the untrusted non-3GPP access is initiated.

One problem that may occur when the UE wants to perform pre-establishment with a target ePDG is that the ePDG is not reachable from the existing PDN connection (see FIG. 2), neither via the PDN-GW nor via the Packet Data Network. This may for example happen due to access restrictions that the Packet Data Network (e.g. corporate network or IMS/SMS network) does not allow to connect to an external network, i.e. an ePDG, or in case of handover with PDN/PDN-GW/IP-address change that the ePDG is not reachable from the new connection.

Further, the UE may not know whether the ePDG is reachable from any of the PDNs the UE is connected to and the detection of ePDG unreachability may increase signalling load (e.g. for bearer creation for reachability test), may take time and thus increase handover delay.

The delay may even take minutes, because according to the procedure described in the 3GPP TS 23.402, section 7.2.1 and 7.3, the UE sends an IKE_SA_NIT message to the ePDG and if the ePDG is not reachable either no response is received or an ICMP destination unreachable may be received. The IKEv2 standard suggests to retransmit requests over a period of several minutes and also "[ . . . ] an endpoint MUST NOT conclude that the other endpoint has failed based on any routing information (e.g., ICMP messages) [ . . . ] an endpoint MUST conclude that the other endpoint has failed only when repeated attempts to contact it have gone unanswered for a timeout period [ . . . ] it is suggested that messages be retransmitted at least a dozen times over a period of at least several minutes before giving up on an SA" (confer section 2.4 of IETF RFC 4306).

SUMMARY OF THE INVENTION

One object of the invention is to reduce the delay to a handover procedure or upon attachment of a mobile node to an access network implied by mechanisms to discover a trusted packet data gateway, such as for example an ePDG.

The object is solved by the subject matter of the independent claims. Advantageous embodiments of the invention are subject matters of the dependent claims.

One aspect of the invention is to facilitate a fast establishment of a secure tunnel to a trusted packet data gateway upon a mobile node attaching or handing over to a target access network. For this purpose, the mobile node maintains a reachability list that can be consulted to identify a trusted packet data gateway (e.g. ePDG) or trusted packet data gateways that are reachable in the target access network, i.e. to which the mobile node may establish a secure tunnel. If the mobile node can identify a reachable trusted packet data gateway for a given access network from the reachability list, the mobile node establishes a secure tunnel to the trusted packet data gateway upon attaching to the given access network. In some variations, the secure tunnel may be pre-established prior to the attachment to a target access network. This tunnel may be pre-established tentatively, i.e. it is not used for routing data until the secure tunnel gets activated. Accordingly, upon the mobile node attaching to the target access network, it may activate a pre-established tunnel.

In accordance with this aspect of the invention, one exemplary embodiment of the invention provides a method for establishing a secure tunnel to a trusted packet data gateway upon a mobile node initially attaching to or performing a handover to a target access network. According to this method the mobile node determines from a reachability list maintained in the mobile node at least one trusted packet data gateway that is reachable through the target access network, and establishes a secure tunnel to said determined trusted packet data gateway.

It should be further noted, that the different methods for establishing a secure tunnel to a trusted packet data gateway upon a mobile node initially attaching to or performing a handover to a target access network described herein may be only performed by the mobile node, in case the IP address configured on a mobile node's interface to the target access network is differing from the IP address configured on a mobile node's interface to the source access network, or in case the a trusted packet data gateway to which the mobile node has established a tunnel through the source access list is not reachable through the target access network according to the reachability list. In other words, the different methods need to be performed only if the trusted packet data gateway cannot be reached through the target access network.

This is because of a secure tunnel respectively the security association (e.g. an IPsec association) is typically bound to a specific IP address of the mobile node. As long as the mobile node's IP address is not changing and as long as the counterpart trusted packet data gateway of the security association is reachable, no new security association respectively new secure tunnel to a new trusted packet data gateway needs to be established (unless desired due to other reasons).

In another embodiment of the invention, the reachability list is listing data sets. The data sets indicate data paths and the reachability status of respective known trusted packet data gateways for each respective data path. The way a respective data path is indicated in the reachability list is implementation specific. For example the data paths could be indicated by combinations of access network identifiers, core network identifiers and access point names, combinations of core network identifiers and access point names or simply by access point names.

In a further embodiment of the invention, the mobile node further tries to establish a secure tunnel to a trusted packet data gateway (i.e. an arbitrary trusted packet data gateway) upon the mobile node having attached to the target access network, if it could not determine any access point name of a packet data network from the stored list through which a trusted packet data gateway can be reached. The trusted packet data gateway to which the mobile node tries to establish a secure tunnel may be for example pre-configured in the mobile node or could be learned by the mobile node from a DNS query sent by the mobile node to the target access network.

In case the mobile node tries to establish a secure tunnel to a trusted packet data gateway (due to no access point name of a packet data network from the stored list through which a trusted packet data gateway can be reached is listed in the reachability list), the mobile node may optionally further add a data set indicating the data path to said unreachable trusted packet data gateway to the reachability list and an indication that the unreachable trusted packet data gateway is not reachable through the data path, in case no secure tunnel can be established to a trusted packet data gateway due to the trusted packet data gateway being unreachable. In a similar fashion, the mobile node may optionally add to the reachability list a data set indicating the data path to said reachable trusted packet data gateway and that the reachable trusted packet data gateway is reachable through the data path, in case a secure tunnel can be established to a trusted packet data gateway.

Accordingly, in another embodiment of the invention, the mobile node dynamically learns and maintains information on trusted packet data gateways that can be or that can not be reached through the respective data paths. Likewise, the mobile node may update the reachability list, if the reachability status of a trusted packet data gateway changes for a given data path.

In some of the exemplary embodiments discussed above, the mobile node has been updating and building up its reachability list based on the successful and failed connection attempts to trusted packet data gateways. In another embodiment, the reachability list of the mobile node may be received from another mobile node or network node in the access network or core network connected thereto. The received reachability list could be used to update the already existing "local" reachability list of the mobile node or as a replacement thereof.

In order to enable checking whether the reachability list as such or its list entries are up-to-date, the list or its respective entries may therefore comprise a time stamp (or time stamps for the individual list entries) based on which the mobile node may check when the information has been last updated so as to update the reachability list or individual entries thereof. Obviously, the mobile node should try to maintain the latest information on the reachability status to the trusted packet data gateways.

In one exemplary implementation the reachability list could consist of two list: a white list listing the data paths of trusted packet data gateway being reachable through the respective data path and the respective of trusted packet data gateway and a black list listing the data paths of trusted packet data gateway not being reachable through the respective data path and the respective of trusted packet data gateway.

In the exemplary embodiments described above, the mobile node has established the secure tunnel to the trusted packet data gateway upon having handed-over to the target access network, i.e. through the target access network. Another alternative option according to another embodiment of the invention is to have the mobile node to try maintaining the connection to the trusted packet data gateway to which it already maintains a secure tunnel when located in the source access network.

Accordingly, in a further exemplary embodiment of the invention provides a method for establishing a secure tunnel to a trusted packet data gateway, wherein the mobile node first established a secure tunnel to the trusted packet data gateway through the source access gateway and via a packet data network gateway prior to handover to another access network, i.e. the target access network. Prior to attachment to the target access network, the mobile node will check whether the trusted packet data gateway can be reached through the target access network. This can be for example done by checking reachability status of the trusted packet data gateway through the target access network based on a reachability list maintained by the mobile node. If the trusted packet data gateway can also be reached through the target access network, the mobile node may request (via the source access network) a core network node (e.g. AAA, HSS) of a core network (PLMN) connected to the source access network to maintain the connection to the trusted packet data gateway via the packet data network gateway upon the mobile node attaching to the target access network. This solution may be for example advantageous in situations where the subscription profile of the mobile node requires a change of the local mobility anchor (LMA)—the functionality of which can be for example implemented in the PDN-GW—for inter-PLMN handovers, but the mobile node desires to maintain its connection to its current local mobility anchor (e.g. PDN-GW).

The invention also provides a mobile node that is capable of performing one of the different methods for (pre-)establishing a secure tunnel to a trusted packet data gateway. Accordingly, the invention according to a further embodiment provides a mobile node that comprises a processing unit (for example a processor, digital signal processor (DSP) or other dedicated hardware or circuitry that is suitable or suitably programmed) for determining from a reachability list maintained in the mobile node at least one trusted packet data gateway that is reachable through the target access network. The mobile node further comprises a communication unit (for example a transmitter unit and a receiver unit) for establishing a secure tunnel to the determined trusted packet data gateway upon the mobile node initially attaching to or performing a handover to a target access network.

Another embodiment of the invention is providing a mobile node that comprises a communication unit (for example a transmitter unit and a receiver unit) for established a secure tunnel to the trusted packet data gateway through a source access gateway and via a packet data network gateway prior to handover, and a processing unit for checking prior to attachment to the target access network whether the trusted packet data gateway can be reached through the target access network by checking reachability status of the trusted packet data gateway through the target access network based on a reachability list maintained by the mobile node. The mobile node's communication unit could be further adapted or suitably controlled by the processing unit to request via the source access network the core network node of a core network connected to the source access network to maintain the connection to the trusted packet data gateway via the packet data network gateway upon the mobile node attaching to the target access network.

The mobile node according to a further embodiment of the invention may comprise means (such as memory, specially dedicated or programmable hardware or circuitry, etc.) that allow the mobile node to perform the steps of any method according to the various embodiments of the invention described herein.

Further embodiments of the invention relate to the implementation of the methods described herein by means of software I a computer program. Accordingly, another embodiment of the invention provides a computer readable medium storing instructions that, when executed by a processor of a mobile node, cause the mobile node to establish a secure tunnel to a trusted packet data gateway upon a mobile node initially attaching to or performing a handover to a target access network, by determining from a reachability list maintained in the mobile node at least one trusted packet data gateway that is reachable through the a target access network, and establishing a secure tunnel to said determined trusted packet data gateway.

Another embodiment of the invention provides a computer readable medium storing instructions that, when executed by a processor of a mobile node, cause the mobile node to establish a secure tunnel to a trusted packet data gateway, by established a secure tunnel to the trusted packet data gateway through a source access gateway and via a packet data network gateway prior to handover, checking prior to attachment to the target access network whether the trusted packet data gateway can be reached through the target access network by checking reachability status of the trusted packet data gateway through the target access network based on a reachability list maintained by the mobile node, and requesting via the source access network the core network node of a core network connected to the source access network to maintain the connection to the trusted packet data gateway via the packet data network gateway upon the mobile node attaching to the target access network.

In most exemplary embodiment of the invention described above, the mobile node has been using a reachability list to determine which trusted packed data gateway can be reached in a given access network. The following exemplary embodiments relate to an alternative approach, where the network provides the mobile node with information on reachable trusted packed data gateways. This approach may optionally also be used in conjunction with the mobile node maintaining a reachability list, e.g. the information received from the network may be used to update the local reachability list maintained by the mobile node.

According to this alternative approach, another embodiment of the invention provides a method for establishing a secure tunnel to a trusted packet data gateway. The mobile node transmits a message (e.g. an attach message or a tracking area update message) to a first access network upon the mobile node attaching or handing over to the first access network or upon the mobile node creating an additional packet data network connection to the first access network. In response to this message, the mobile node receives a response message that indicates whether pre-establishment of a secure tunnel to a trusted packet data gateway is possible through the first access network or not. If so, the mobile node pre-establishes a secure tunnel to a trusted packet data gateway through the first access network prior to the mobile node attaching or performing a handover to a second access network. In this embodiment, it may be feasible that the trusted packet data gateway to which the secure tunnel is pre-established is also reachable for the mobile node through the second access network. The first access network may be, for example, a 3GPP-based network.

The message transmitted by the mobile node to the first access network could for example comprise at least one of location information on the mobile node's current location, an IP address of a trusted packet data gateway the mobile node desires to connect, one or more access network identifiers, one or more core network identifiers and one or more access point names.

In a further embodiment of the invention, a packet data gateway could compile information for transmission to the mobile node using the response message based on the information included by the mobile node to the message transmitted by the mobile node to the first access network. This packet data gateway could be, for example, located in the mobile node's home 3GPP network.

According to another embodiment of the invention, the response message comprises one or more addresses of trusted packet data gateways, and optionally further comprises an indication of the reachability status of the respective trusted packet data gateways through respective target access networks, and/or a prioritization of the trusted packet data gateways. As mentioned before, this information could optionally be used to update a reachability list, if such list is maintained by the mobile node.

In line with this network-based approach, another embodiment of the invention is providing a mobile node for establishing a secure tunnel to a trusted packet data gateway. The mobile node comprises a transmitter for transmitting an attach message (or tracking area update message) to a first access network upon the mobile node attaching or handing over to the first access network or upon the mobile node creating an additional packet data network connection to the first access network, and a receiver for receiving at the mobile node a response message to the attach message (or tracking area update message), wherein the response message indicates whether pre-establishment of a secure tunnel to a trusted packet data gateway is possible through the first access network or not. Furthermore, the mobile node comprises a processor configured to control the mobile node to pre-establish a secure tunnel to a trusted packet data gateway through the first access network prior to the mobile node attaching or performing a handover to a second access network.

Likewise, another embodiment of the invention is related to a computer-readable medium storing instructions that, when executed by a processor of a mobile node, cause the mobile node to establish a secure tunnel to a trusted packet data gateway, by transmitting a message from the mobile node to a first access network upon the mobile node attaching or handing over to the first access network or upon the mobile node creating an additional packet data network connection to the first access network, receiving at the mobile node a response message to the attach message (or tracking area update message), wherein the response message indicates whether pre-establishment of a secure tunnel to a trusted packet data gateway is possible through the first access network or not, and pre-establishing by the mobile node a secure tunnel to a trusted packet data gateway through the first access network prior to the mobile node attaching or performing a handover to a second access network.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
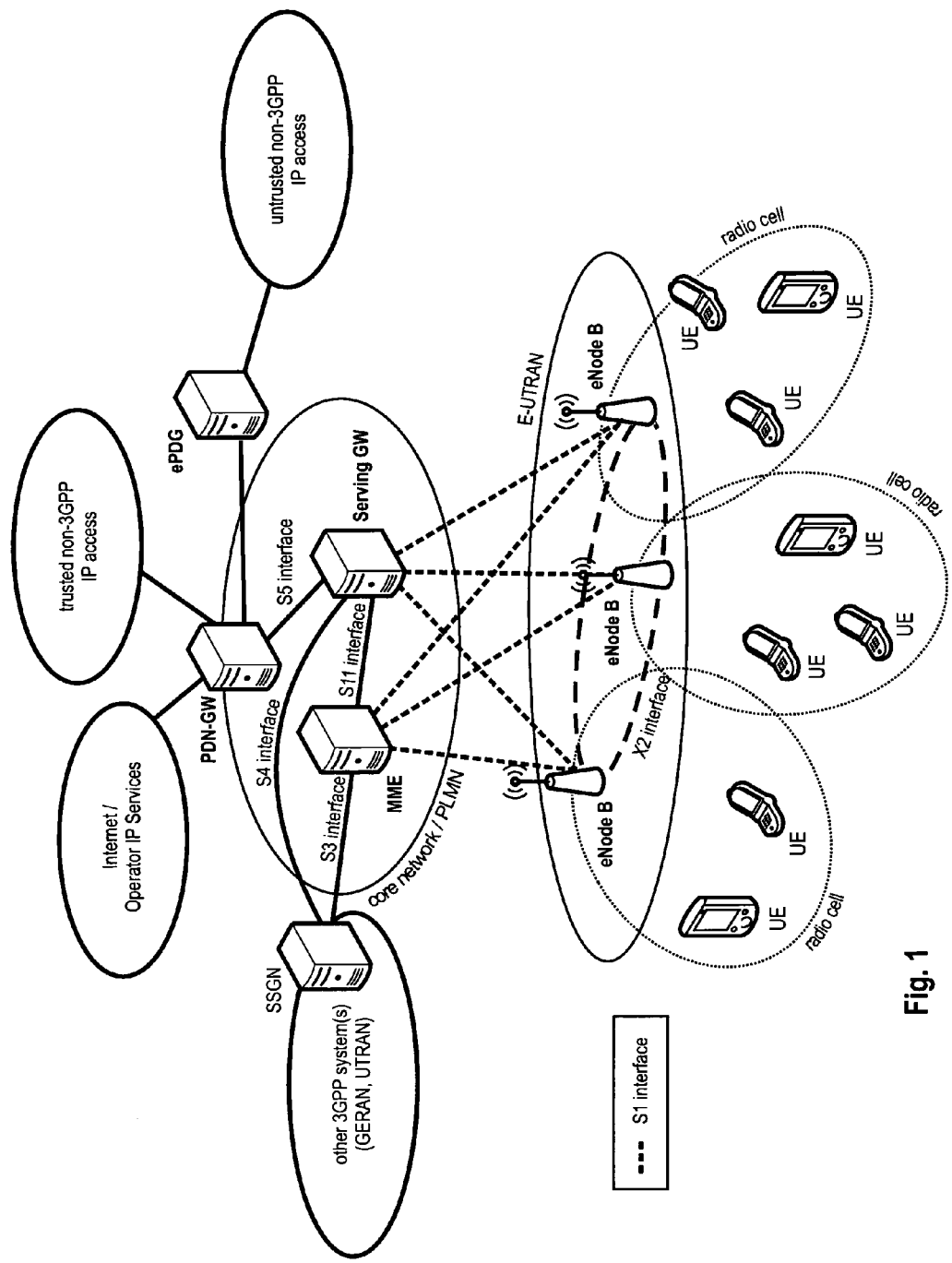
FIG. 1 shows an exemplary architecture of a 3GPP LTE system.
Figure 2:
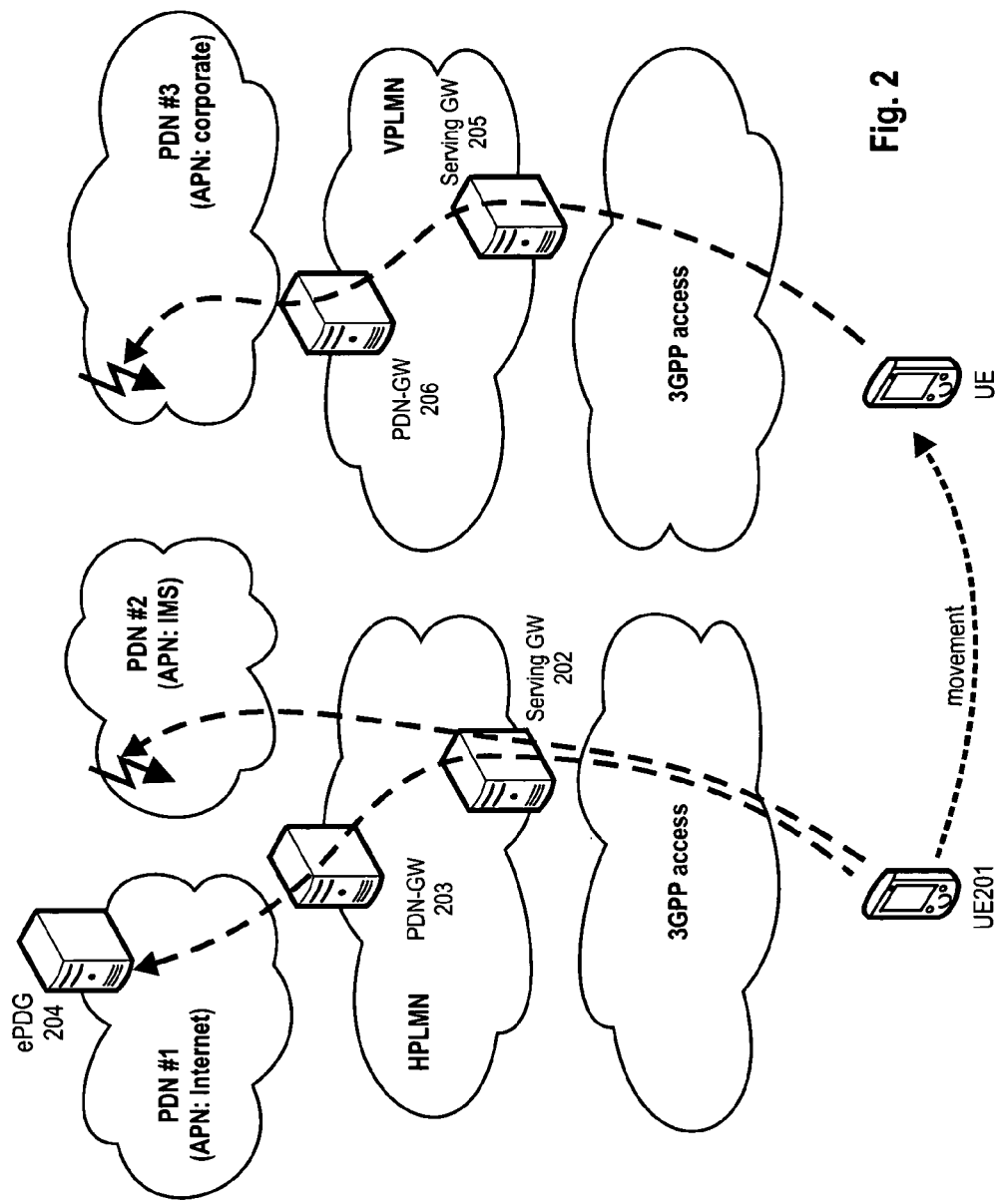
FIG. 2 shows an exemplary communications network with different access networks, PLMNs and PDNs for highlighting the changing reachability of ePDGs.

The following paragraphs will describe various embodiments of the invention. For exemplary purposes only, most of the embodiments are outlined in relation to an (evolved) communication system according to LTE discussed in the Technical Background section above. Please note that the terms mobile node (MN) and user equipment (UE) are interchangeable terms.

One aspect of the invention is to facilitate a fast establishment of a secure tunnel to a trusted packet data gateway upon a mobile node attaching or handing over to a target access network. Fast establishment of a secure tunnel also includes a pre-establishment of a tentative secure tunnel, which is later on activated by the mobile node when attaching to the target access network, e.g. as part of a handover from a source access network to the target access network. In some embodiments of the invention, the mobile node maintains a reachability list that can be consulted to identify a trusted packet data gateway (e.g. ePDG) or trusted packet data gateways that are reachable in the target access network. Reachable means that the mobile node can establish a secure tunnel to a given trusted packet data gateway through a given access network.

Regarding the maintenance of the reachability list, the mobile node may for example investigate the reachability of a trusted packet data gateway for a given access point name (or data path) and may store this information in a reachability list. Accordingly, if the mobile node attaches again to this access network at a later point in time, it can learn from the maintained reachability list which trusted packet data gateway should be reachable for a given access point name (given that the reachability status has not changed in the meantime) and may thus avoid delays in the reachability detection that could be caused by trying to set up a secure tunnel to a trusted packet data gateway not reachable.

As will be explained further down below, there are various possibilities how the Teachability list is implemented, i.e. which information is maintained therein. In the most simple implementation, the reachability list indicates one or more trusted packet data gateways for respective access point names and the reachability status (reachable/not reachable for the given access point name) of each trusted packet data gateways.

In a more sophisticated implementation, the reachability list may indicate for each data path, which trusted packet data gateways are reachable or not. The simplest representation of a data path is an access point name—in this case the implementation corresponds to the most simple implementation discussed above. In other examples, the data path could be formed by a combination of an access point name and a given PLMN identifier, or a combination of an access point name, a given PLMN identifier and a given access network identifier. Examples for an access network identifier are the SSID (Service Set Identifier) of a WLAN access point, an access point identifier, a tracking area identifier, the identifier of a Node B in a 3GPP-based system, etc.

Generally, it should be noted that the content and design of the reachability list is implementation specific and may also depend on the reachability status. In most cases the reachability list should indicate an access point name and identifier of a trusted packet data gateway. For entrusted access, it would also be feasible to store an identifier of untrusted access network and a trusted packet data gateway together with its reachability status. In an untrusted access, the mobile node is not connected to the trusted packet data gateway via a PDN-GW so that it is not required to store information on the PDN-GW or APN.

In one exemplary embodiment of the invention, the reachability list consists of two lists, a white list and a black list, both maintained by the mobile node. When the mobile node performs an initial attach to an access network or a handover resulting in a change of the access network and/or PLMN, it makes use of the white list and black list to determine whether and which trusted packet data gateway (e.g. ePDG) will be reachable after handover.

For example in a phase of reliable operation, e.g. no upcoming handover to untrusted non-3GPP access, the mobile node could try to establish different PDN connections and to reach different ePDGs through those PDN connections. The reachability of the ePDGs could be tested, for example, by starting an IKE/IPSec signaling procedure to pre-establish an IKE/IPSec association/tunnel. In case the secure tunnel can be pre-established for a given PDN connection (identified by a given access point name), the mobile node may add or update the white list to indicate the respective trusted packet data gateway (e.g. ePDG) being reachable through a given data path, respectively PDN connection. Unsuccessful tunnel establishments are tracked in the black list. In case the mobile node is located in a trusted access network when checking the reachability of ePDGs, the secure tunnels may be established only tentatively, as will be outlined further down below.

In one exemplary embodiment of the invention, the white list contains a list of access point names and related access network IDs and PLMN IDs from which an ePDG is reachable. An example of a white list is illustrated in Table 1.

TABLE 1

| APN | Access Network ID | PLMN ID | Reachable ePDG |
|---|---|---|---|
| Internet | 3GPP-LTE | operator1.com | ePDG1 |
| Internet | 3GPP-UTRAN | operator1.com | ePDG1 |
| Internet | 3GPP-GERAN | operator1.com | ePDG1 |
| Internet | HRPD | operator1.com | ePDG1 |
| Corporate network | 3GPP-LTE | operator1.com | ePDG2 |
| Corporate network | 3GPP-UTRAN | operator1.com | ePDG2 |
| Corporate network | 3GPP-GERAN | operator1.com | ePDG2 |
| Corporate network | HRPD | operator1.com | ePDG2 |
| IMS | 3GPP-LTE | operator1.com | ePDG1 |
| IMS | HRPD | operator1.com | ePDG1 |
| Internet | 3GPP-LTE | operator2.com | ePDG1 |
| Internet | 3GPP-LTE | operator2.com | ePDG3 |
| Internet | 3GPP-UTRAN | operator2.com | ePDG1 |
| Internet | 3GPP-UTRAN | operator2.com | ePDG3 |
| IMS | 3GPP-LTE | operator2.com | ePDG3 |
| IMS | 3GPP-UTRAN | operator2.com | ePDG3 |

According to the embodiment, the black list contains a list of access point names and related access network Ds and PLMN IDs from which an ePDG is not reachable. An example of a black list is given below in Table 2.

TABLE 2

| APN | Access Network | PLMN | Unreachable ePDG |
|---|---|---|---|
| Internet | 3GPP-LTE | operator1.com | ePDG2 |
| Internet | 3GPP-LTE | operator1.com | ePDG3 |
| Internet | 3GPP-UTRAN | operator1.com | ePDG2 |
| Internet | 3GPP-UTRAN | operator1.com | ePDG3 |
| Internet | 3GPP-GERAN | operator1.com | ePDG2 |
| Internet | 3GPP-GERAN | operator1.com | ePDG3 |
| Internet | HRPD | operator1.com | ePDG2 |
| Internet | HRPD | operator1.com | ePDG3 |
| Corporate network | 3GPP-LTE | operator1.com | ePDG1 |
| Corporate network | 3GPP-LTE | operator1.com | ePDG3 |
| Corporate network | 3GPP-UTRAN | operator1.com | ePDG1 |
| Corporate network | 3GPP-UTRAN | operator1.com | ePDG3 |
| Corporate network | 3GPP-GERAN | operator1.com | ePDG1 |
| Corporate network | 3GPP-GERAN | operator1.com | ePDG3 |
| Corporate network | HRPD | operator1.com | ePDG1 |

TABLE 2-continued

| APN | Access Network | PLMN | Unreachable ePDG |
|---|---|---|---|
| Corporate network | HRPD | operator1.com | ePDG3 |
| IMS | 3GPP-LTE | operator1.com | ePDG2 |
| IMS | 3GPP-LTE | operator1.com | ePDG3 |
| IMS | HRPD | operator1.com | ePDG2 |
| IMS | HRPD | operator1.com | ePDG3 |
| Internet | 3GPP-LTE | operator2.com | ePDG2 |
| Internet | 3GPP-UTRAN | operator2.com | ePDG2 |
| IMS | 3GPP-LTE | operator2.com | ePDG1 |
| IMS | 3GPP-LTE | operator2.com | ePDG2 |
| IMS | 3GPP-UTRAN | operator2.com | ePDG1 |
| IMS | 3GPP-UTRAN | operator2.com | ePDG2 |

In the following an exemplary embodiment of the invention is described with reference to FIG. 3 and FIG. 4, where white list and black list are used to pre-establish a secure tunnel to a trusted packet data gateway. In case of an initial attach to an access network, the mobile node (UE 301) first checks the access network and PLMN it is connected to. The access network can be for example identified by the access network identifier that is commonly broadcast in the radio cells of the access network. For instance, in a WLAN the WLAN access points (AP) typically broadcast their SSID in the coverage area. In a 3GPP based access, the Node Bs typically broadcast a Tracking Area code and cell identification. Other options are that the access point names are pre-configured in the mobile node, are downloaded by the mobile node from the Internet, may be manually entered to the mobile terminal by the user, etc. In other words, there are manifold possibilities how to provide the mobile node with different access point names. Furthermore, the PLMN identifier is also typically broadcast within the access network connected thereto. Other options to identify the PMLN attached to the access network are essentially the same as identified for the identification of the access network before.

Figure 3:
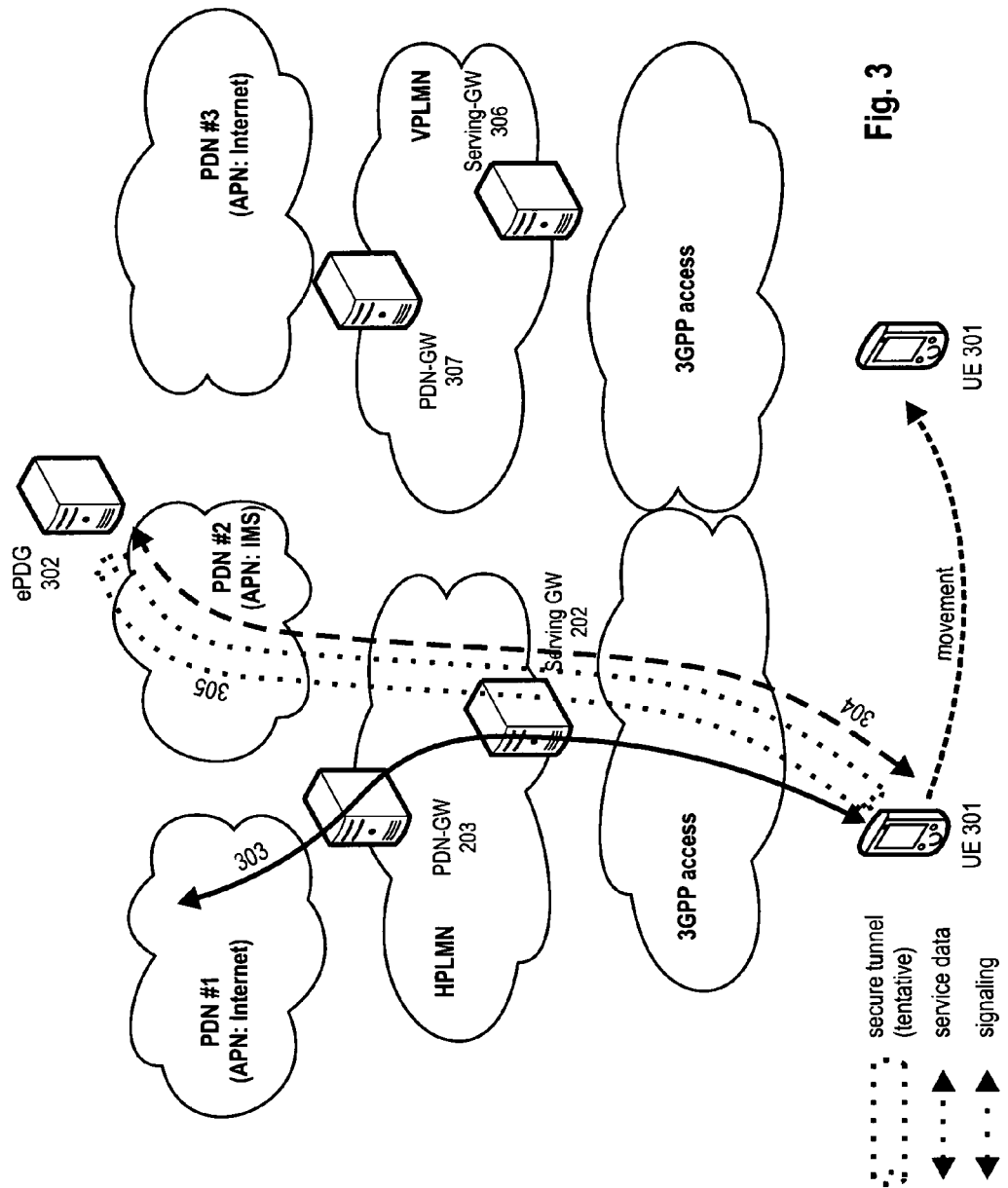
FIGS. 3 & 4 show an exemplary establishment of a secure tunnel pre-establishment and its activation upon the mobile node attaching to an untrusted access according to an exemplary embodiment of the invention.

As shown in FIG. 3, it may be exemplarily assumed that the mobile node initially attaches to a 3GPP access network (i.e. a trusted access network) and that the PLMN is the Home PLMN (HPLMN) of the mobile node. The mobile node will thus recognize that it is connected to a 3GPP access network, so there is no need for the mobile node to use a secure tunnel to an ePDG 302 for using 3GPP services.

When the mobile node attaches to its HPLMN (or to any other PLMN), the serving PDN-GW 203 therein will assign an IP address to the mobile node that is used by the mobile node for IP communication (303). When having established IP connectivity to the access network, or rather to the PLMN, the mobile node may look up a trusted packet data gateway, an ePDG 302 that is reachable in the PLMN using the white list and black list. For this purpose, the mobile node selects one of the APNs in the white list for which an ePDG is indicted as reachable (here, APN: IMS). In case the ePDG's external IP address is not known from the white list or black list, the mobile node could use a DNS service to resolve a reachable ePDG's external IP address. In this connection the external IP address denotes the ePDG's IP address reachable from a PON matching the selected APN. In the example of FIG. 3, the external IP address of the ePDG is the IP address configured on its interface reachable from PDN #2 (APN: IMS).

If there is a reachable ePDG 302 that can be identified by the mobile node, the mobile node tries to pre-establish (304) a secure tunnel thereto for potential use when moving to a non-trusted access network. This pre-established secure tunnel (306) is however only established tentatively, i.e. the secure tunnel is not used for data communication unless being activated, as will be described below. For this reason, the mobile node could use any APN listed in the white list to choose an ePDG, i.e. the choice of the ePDG is not depending on the actual APN the mobile node is currently using. Preferably, the chosen ePDG 302 should be reachable from the untrusted access network the mobile node is potentially moving to, so that the mobile node can use the ePDG 302 (i.e. activate the tentative pre-establish secure tunnel) when moving to the new access network.

Moreover, optionally, ePDG 302 could pre-establish a tentative tunnel to PDN-GW 203 that it might use when the mobile node is activating its tentative secure tunnel to ePDG 302. This tentative tunnel between ePDG 302 and PDN-GW 203 is also not active, i.e. the ePDG 302 and PDN-GW 203 do not route data for/from the mobile node through this tunnel until it is activated. If the tunnel between ePDG 302 and PDN-GW 203 is not pre-established, the ePDG used by the mobile node when moving to an untrusted access can also establish the tunnel in response to the mobile node activating a pre-established secure tunnel to the ePDG or first establishes a secure tunnel to the ePDG.

For (pre-)establishing the secure tunnel, the mobile node may for example use the IKEv2 protocol mentioned above to establish an IKEv2 security association to the ePDG first. The IKE security association essentially provides a set of shared keys between the communication partners that may be subsequently used for establishing an IPsec security association.

The IPsec security association defines in pertinent part the communication partners, which data packets are to be transmitted to which IP address, and the encryption used for the transmission of said packets, etc. Therefore, the IPsec security association may be also referred to as an IPsec tunnel. It should be noted that although an IPsec tunnel is pre-established, the IPsec tunnel is not activated, i.e. ePDG and mobile node maintain the IPsec tunnel in a "tentative" or "deactivated" state and will not route data packets destined to the respective IP addresses to which the IPsec security association is bound through the IPsec tunnel.

Furthermore, it should be noted that the mobile node will use the IP address assigned to the mobile node by the serving PDN-GW for establishing the tentative IPsec tunnel. Hence, the security association of the IPsec tunnel is bound to this IP address of the mobile node and the ePDG's external IP address. In this connection, it should be further noted that the mobile node will use the ePDG's external IP address for the pre-establishment of the IPsec tunnel. If for example the ePDG is located in the same PLMN as the PDN-GW, the control signalling for establishing the tentative IPsec tunnel is not routed internally in the PLMN but through the "external" PDN to the external IP address of the ePDG. The routing of the data to the external IP address of the external IP address of the ePDG may be implementation dependent. For example, serving gateway or the PDN-GW could also allow internal routing to the external IP address, e.g. by establishing a static route to the ePDG through the PLMN, although the IP address used for addressing the signalling is an external IP address of the ePDG.

Figure 4:
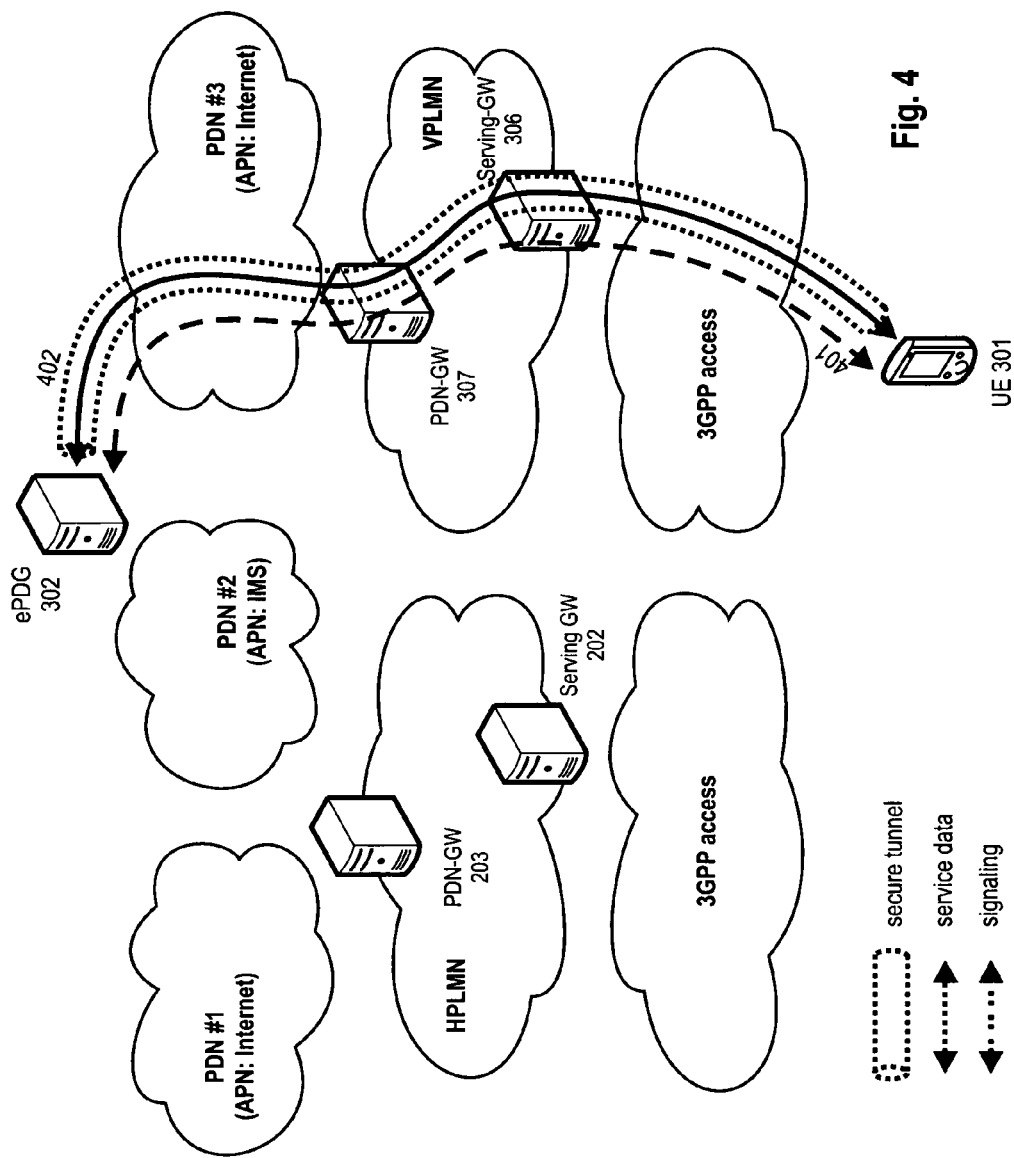

The situation upon the mobile node moving to the next access network (e.g. by means of a handover) is exemplarily illustrated in FIG. 4. Upon the mobile node (UE 301) having moved to another 3GPP access network, it again checks the access network and PLMN it is connected to. In this case the mobile node is detecting that it moved to another access network and has changed the PLMN and the PDN-GW, so that it needs to update the pre-established tunnel to the ePDG. Similar to the situation in FIG. 3, upon attachment to the new trusted access network, the serving PDN-GW 307 therein will assign an IP address to the mobile node that is used by the mobile node for IP communication (e.g. if the new PLMN is not belonging to the same PMIP domain). The mobile node checks whether the pre-established tentative tunnel (305) to ePDG 302 can be used in the new access network by consulting the white list and black list.

In this example, the white list indicates to the mobile node that ePDG 302 is reachable through the PDN #3 (APN: Internet). Since it is assumed that the IP address of the mobile node has changed when moving to the new 3GPP access network, the IPsec security association to ePDG 302 is bound to an IP address the mobile node is not using any longer. Accordingly, to update the tentative secure tunnel to ePDG 302, the mobile node 401 updates its IP address of the security association to ePDG 302 as will be described further down below in more detail.

In case the mobile node should detect upon attachment to the new access network that the tentative secure tunnel to ePDG 302 cannot be used in the new access network, i.e. a check of black list and white list reveals that there is no entry of ePDG 302 in the white list for the new data path (i.e. the new access network ID, PLMN ID and APN), the mobile node selects another APN from the white list for which a reachable ePDG is known and attaches to the selected APN, respectively PDN and tries to establish a secure tunnel to this ePDG in a similar fashion as described for ePDG with respect to FIG. 3.

Furthermore, it should be noted that in the example described with respect to FIG. 3 and FIG. 4 above, it has been assumed that the binding of a security association to the IP address used for establishing same can be updated via signaling between the mobile node and ePDG 302 in case the IP address of the mobile node is changing. However, this might not be possible in all scenarios. If for example the binding of the security association cannot be updated, the mobile node may need to establish a new secure tunnel to a reachable ePDG when moving to the new trusted access network. This can be accomplished by the mobile node detecting the access network and PLMN it is connected to and checking the white list and black list for an ePDG that can be reached for a given APN in a similar fashion as described above.

As exemplified above in relation to FIG. 4, if the UE performs a handover to another access network and another PLMN, it may happen that the PDN network and the IP address are changed and thus, that the pre-established session is broken because the ePDG is no longer reachable. One possibility to overcome this problem is to do multihoming from both access networks. However, in case of movement, the mobile node may be disconnected soon from the old access network, the power consumption increases and finally multihoming from different access networks does not work for single radio mobile nodes.

Figure 5:
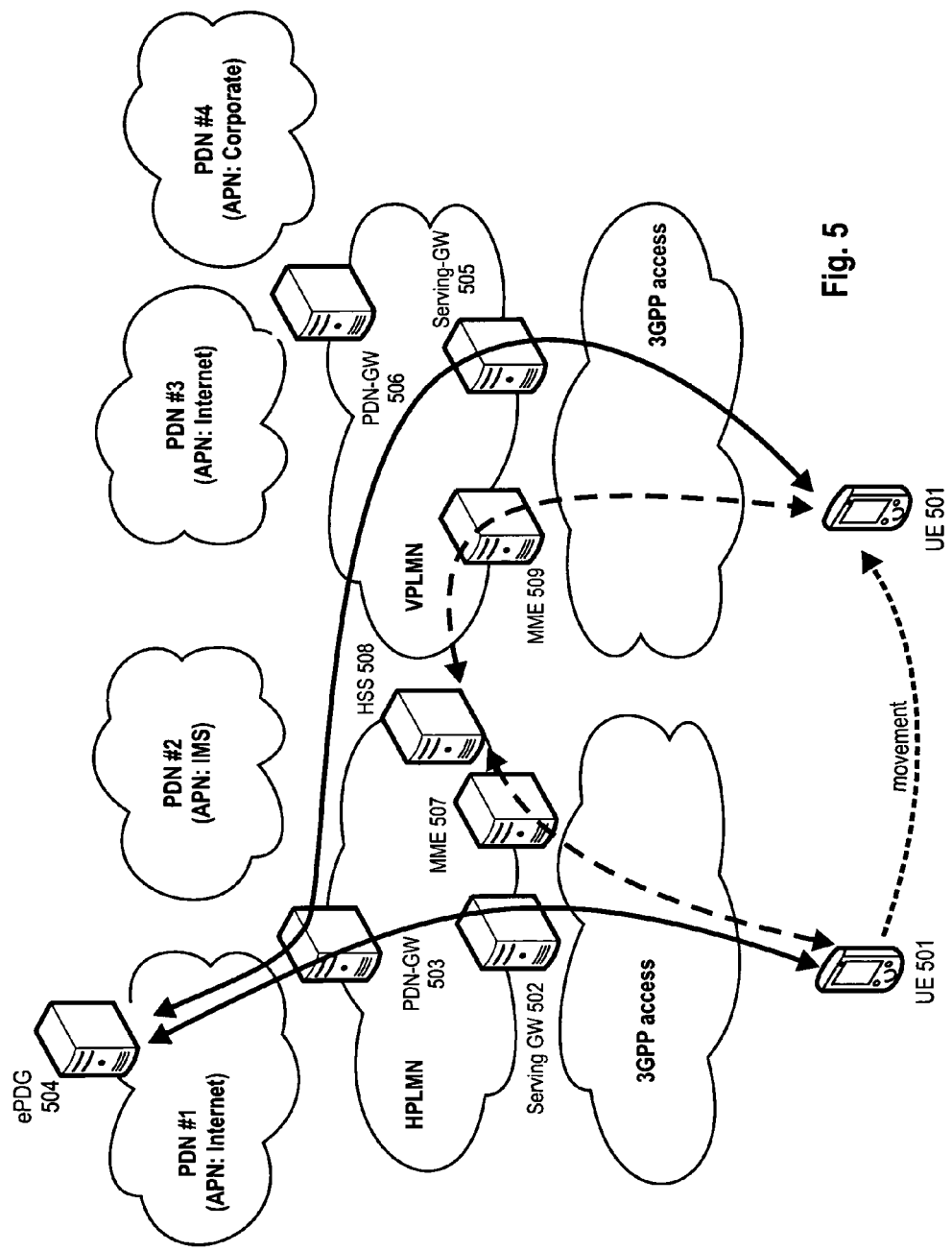
FIGS. 5 & 6 show an exemplary communication network and signaling flow according to another embodiment of the invention, where the mobile node tries to maintain its connection to a PDN-GW when attaching to a new access network.
Figure 6:
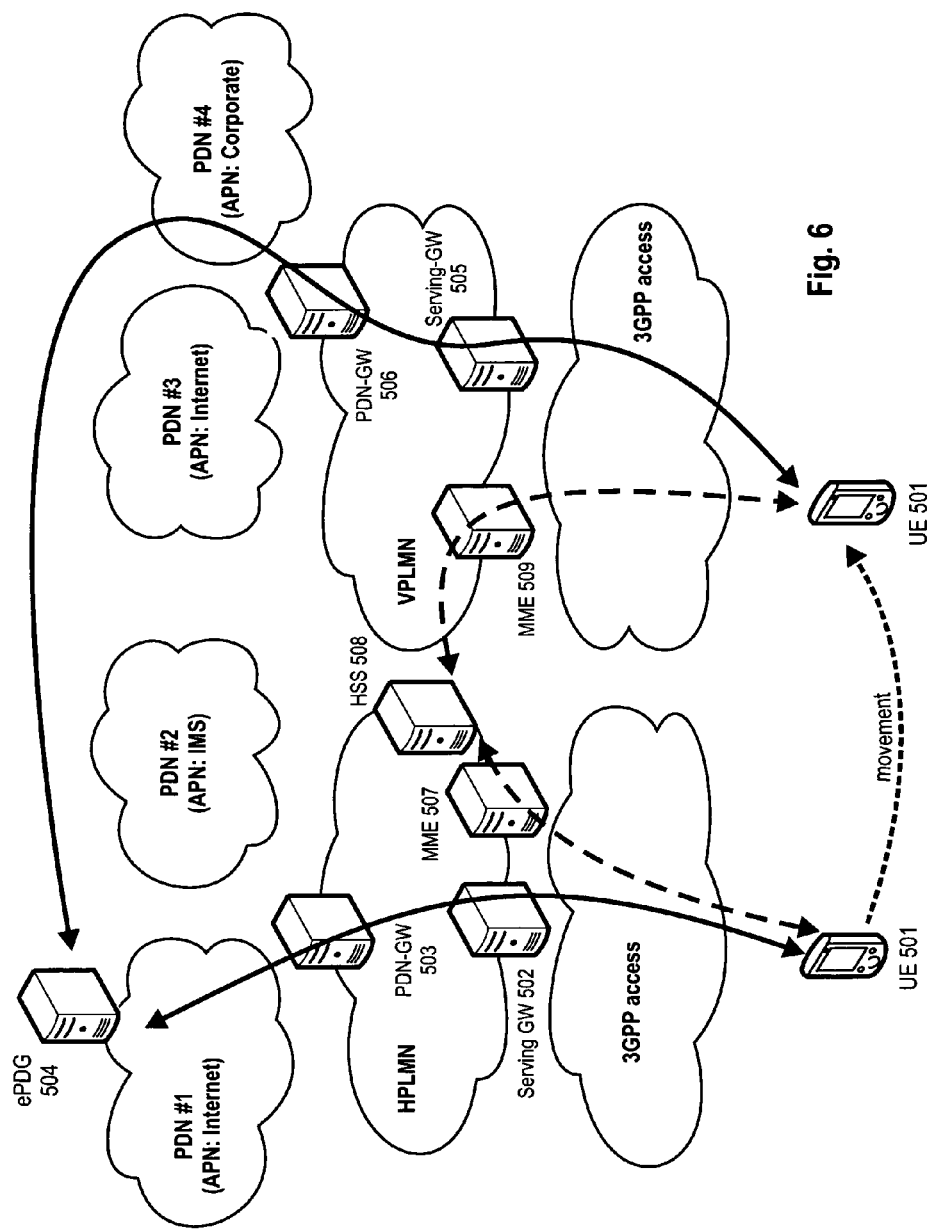

Another solution to avoid the break of a pre-established session according to an exemplary embodiment of the invention is to maintain the connection to the old PDN and thus the reachability to the ePDG. This exemplary embodiment will be explained with respect to FIG. 5.

One potential further problem to consider in case of handover is that the network (e.g. MME or AAA or HSS) could select a different default PDN-GW for the mobile node (UE 501) when attaching to the new 3GPP access upon handover. This may be the case for example due policies that are available in the HPLMN or VPLMN.

As long as the old PDN-GW is reachable from the new PLMN, or more precisely the S-GW in the new PLMN, it should be possible to maintain the connection to the old PDN-GW even if the subscription context for the mobile node or the local operator policies in the new MME allow to select a new PDN-GW. Then, the use of the old PDN-GW 503 and session continuity of the pre-established session to the ePDG can be achieved, if the mobile node (UE 501) requests the source network (e.g. HSS 508 or an AAA server) not to change the PDN-GW when a handover to the new 3GPP access network is performed, in case the mobile node (UE 501) discovers before the handover that the new 3GPP access network is in the black list for the ePDG to which the session (e.g. tentative secure tunnel) has been pre-established. The mobile node (UE 501) could for example use measurement reports to request the HPLMN to not change the PDN-GW after handover to the target access network.

The information from the measurement report, i.e. also the request to not change the PDN-GW, is transferred from mobile node (UE 501) via the 3GPP access to the mobility management entity (MME 507), for example when a handover is triggered. Based on this request, the mobility management entity (MME 507) requests the HSS (or alternatively an AAA server) to not apply the stored policies and to not change the PDN-GW during handover. During handover of the mobile node to the new 3GPP access the target mobility management entity (MME 509) receives the subscription context for the mobile node (UE 501), and will maintain the connection to the old PDN-GW (PDN-GW 503).

When the mobile node (UE 501) moves and connects to the new 3GPP access network, the mobile node (UE 501) is informed on whether the PDN-GW is being changed or not. This could be for example realized by a specific APN signaled to the mobile node (UE 501) during the handover procedure (e.g. during Tracking Area Update) that indicates the PLMN of the PDN-GW providing connectivity to the PDN. If the PDN-GW is changed, e.g. the data is routed by the serving gateway (S-GW 505) in the VPMLN to PDN-GW 506, the mobile node (UE 501) tries to attach to another reachable APN to find an ePDG to which it can pre-establish a tentative secure tunnel. If the PDN-GW is not changed, i.e. routing in the network has been updated so that the serving gateway is routing the data to PDN-GW 503 of the HPLMN, the mobile node (UE 501) is attached to the same APN even if it is black listed in the reachability list.

As already indicated above, there are different possibilities how the mobile node can maintain or obtain a reachability list or reachability information that can be used for identifying reachable ePDGs for a given access so that the establishment of the secure tunnel to an ePDG can be speed up, when the mobile node moves to an untrusted access. Instead of the mobile node creating the reachability list dynamically, it is also possible that the ePDG (or another entity) is creating and storing the white list and shares it with the mobile node. This would accelerate the creation of the white list in the mobile node. For example the mobile nodes could provide information about APN, access network, etc. to the ePDG within the signaling for pre-establishment of the tentative secure tunnel in order to enable the ePDG to create the reachability list. This list could be then downloaded from the ePDG during the pre-establishment of a tentative secure tunnel by the mobile nodes.

An alternative or complementary aspect of the invention does not require the maintenance of a reachability list (but may optionally make use of it). According to this aspect of the invention the mobile node can query the PLMN to which its current access network is connected for potential trusted packet data gateways that could be used when moving to an untrusted access in the vicinity of the current access network. The mobile node receives in response to such query information on trusted packet data gateways. For example, when the mobile node sets up connectivity to a PDN, e.g. upon initial attaching to the access network, the mobile node is informed by some entity in the PLMN on the trusted packet data gateway(s) in the vicinity of the current access network and which are thus candidate target access networks in case of a movement of the mobile node. Furthermore, the information on the packet data gateway(s) in the vicinity of the current access network could also indicate the reachability status if the respective packet data gateway(s) through the current access network. This information can be for example used by the mobile node to pre-establish a tentative secure tunnel to one of the trusted packet data gateways.

In view of the PLMN potentially serving several access networks which could span large geographical areas (e.g. cities or states), it can be advantageous if the mobile node provides the PLMN with some indication of its current location or candidate access networks (e.g. those it received beacon signals from) within the "query" message, e.g. the attach message when attaching to the access network. The location may be for example indicated by some tracking area identifier or could indicate some information on the current access node in the access network, like a base station ID or IP address, the SSD of the access node in a WLAN, etc. Based on this additional information in the query (or attach message), the PLMN node responding to the query (or attach message)—e.g. a PDN-GW, may compile a list of ePDGs that can be reached through the indicated untrusted network(s). Furthermore, the reachability status of the ePDG(s) may be indicated in the response to the query, so that the mobile node may perform a pre-establishment of a tentative secure tunnel to one or more of the indicated ePDGs.

In one exemplary embodiment, the mobile node could use the information obtained from the PLMN to update its Teachability list. If the reachability status of the trusted packet data gateway(s) is indicated by the PLMN, the mobile node can update the Teachability list immediately, otherwise the mobile node may first try to establish a secure tunnel to the indicated trusted packet data gateway(s) to find out whether they are reachable or not.

Figure 7:
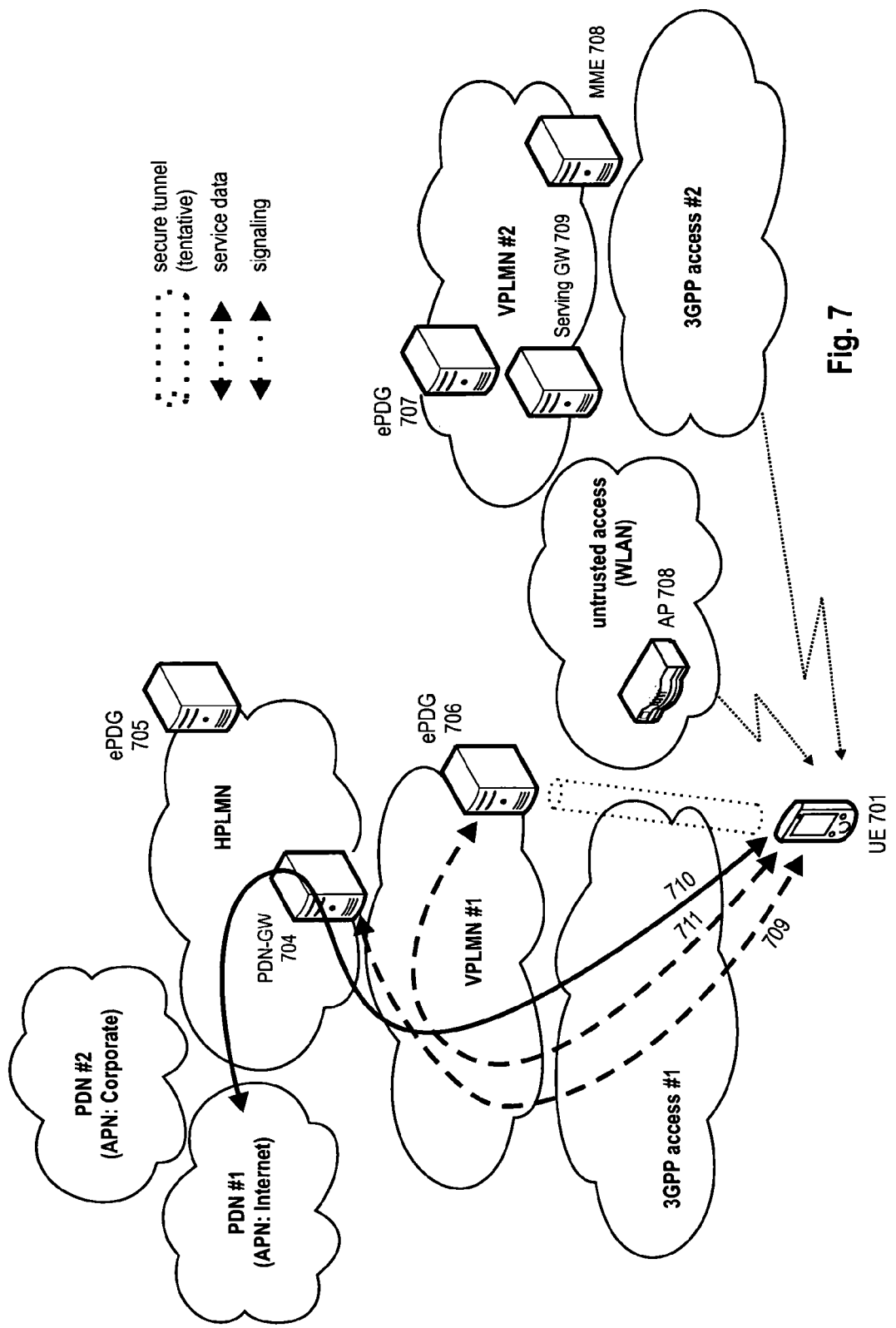
FIGS. 7 & 8 show an exemplary communication network and signaling flow according to an embodiment of the invention, where the mobile node is using a pre-established secure tunnel upon handover to an untrusted access network.

As indicated above, the query for reachable trusted packet data gateways could be sent by the mobile node during the attach procedure to the access network. FIG. 7 illustrates an exemplary signalling procedure of an attachment of a mobile node (UE 701) to a trusted access network according to one exemplary embodiment of the invention. Exemplarily, a roaming scenario is assumed where the mobile node (UE 701) has connected to the network of a roaming partner of its home network. Accordingly, it is assumed for exemplary purposes that the mobile node (UE 701) is attached via the access network of the roaming partner (3GPP access #1) to a visited PLMN (VPLMN #1) of the roaming partner through which it is in turn connected to its home network (HPLMN) through which several services/PDNs can be accessed (PDN #1, PDN #2).

Figure 9:
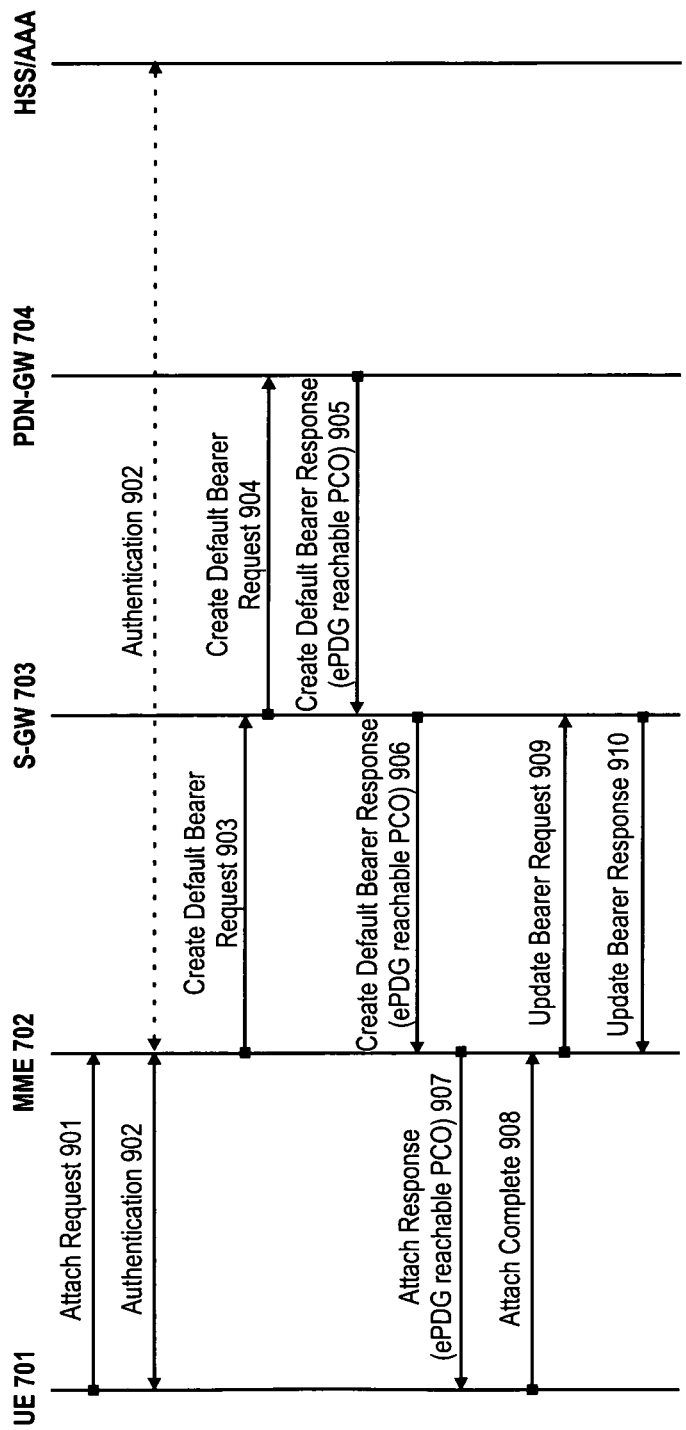
FIG. 9 shows an exemplary message flow in the communication network of FIG. 8 and FIG. 9 according to another embodiment of the invention.

As shown in FIG. 9, in case of initial attach (709) to one of the base stations (eNode Bs) of the 3GPP access the mobile node (UE 701) sends 901 an Attach Request message to the network. The Attach Request message is routed to the mobility management entity (MME 702) of the visited PLMN (VPLMN #1). The attach request message may for example indicate an APN or PDN (e.g. PDN #1/APN: Internet) to which a service is to be established. The mobility management entity (MME 702) and mobile node (UE 701) perform an authentication procedure 902 that may also involve signaling with a HSS/AAA server.

The mobility management entity (MME 702) forms a Create Default Bearer Request message that is sent 903, 904 via the serving gateway (S-GW 703) of the visited PLMN (VPLMN #1) to the packet data network gateway (PDN-GW 704) serving the mobile node (UE 701). The packet data network gateway (PDN-GW 704) may be located in the HPLMN of the mobile node (UE 701).

The packet data network gateway (PDN-GW 704) receiving the Create Default Bearer Request message may set a bit in the Protocol Configuration Options (PCO) of a the Create Default Bearer Response message that is generated in response to the Create Default Bearer Request message to thereby indicate the reachability of an ePDG. In this exemplary solution according to one embodiment of the invention, the mobile node (UE 701) is only informed that an ePDG is reachable by setting the bit in the Create Default Bearer Response message. However, the mobile node (UE 701) may need to use other mechanisms (like a reachability list, a modified DNS or DHCP query) to obtain an IP address of an ePDG to which it may try to pre-establish a tentative secure tunnel.

According to another embodiment of the invention, the mobile node is provided with more detailed information on the ePDG(s) within its vicinity. When receiving the Create Default Bearer Request message, the packet data network gateway (PDN-GW 704) may not know (in advance) which ePDG will be used by the mobile node (UE 701) when moving to an untrusted network and whether this specific ePDG is reachable though the untrusted network. Thus mobile node (UE 701) may give hints to packet data network gateway (PDN-GW 704). For example, the mobile node (UE 701) could include a PCO to the Attach Request message that is copied by the mobility management entity (MME 702) to the Create Default Bearer Request message sent to the packet data network gateway (PDN-GW 704). For example, the mobile node (UE 701) may include to the PCO the IP address of the ePDG it intends to use in the untrusted network, if already available (e.g. due to pre-configuration, from a reachability list or from previous DNS request).

The mobile node (UE 701) can also include parameters (e.g. an APN and an PLMN ID) to the PCO of the Attach Request message that allow the construction of a FQDN for a DNS request by the packet data network gateway (PDN-GW 704) for discovering the ePDG IP address. In addition or alternatively, the mobile node (UE 701) may also include information about the current location, if an ePDG different from the default ePDG is desirable (the mobile node (UE 701) may for example include PLMN Ds of candidate PLMNs in its vicinity. In the example shown in FIG. 7, the mobile node (UE 701) could indicate the SSID of the untrusted access (WLAN) and the VPLMN ID of the other VPLMN #2 of the 3GPP access #2 that is also in its vicinity.

Based on this information provided by the mobile node (UE 701), the packet data network gateway (PDN-GW 704) may compile information to be sent back to the node (UE 701) in the PCO of the Create Default Bearer Response message, e.g. preferred ePDG IP address(es), or a list of ePDGs that are located in the mobile node's vicinity. In the example shown in FIG. 7, the compiled information could indicate the P addresses of ePDGs 705, 706 and 707 and their reachability through the current access network (3GPP access #1).

In the example of FIG. 7, the PCO in the Create Default Bearer Response could list ePDG 705 in the HPLMN, ePDG 706 in VPLMN #1 of the roaming partner, and ePDG 707 in the VPLMN (VPLMN #2) of another roaming partner. Optionally, the reachability status of the listed ePDGs may be indicated in the PCO, if known by the packet data network gateway (PDN-GW 704) or may be added/updated prior to forwarding to the mobile node (UE 701) by the mobility management entity (MME 702).

The packet data network gateway (PDN-GW 704) sends 905, 906 the Create Default Bearer Response message with the PCO including the information on ePDG(s) (ePDG reachable PCO) via the serving gateway (S-GW 703) to the mobility management entity (MME 702). The PCO in the Create Default Bearer Response message are forwarded 907 by the mobility management entity (MME 702) to the mobile node (UE 701) in the Attach Response message. Optionally, the mobility management entity (MME 702) may filter or update the PCO prior to forwarding. For example, the mobility management entity (MME 702) may add the reachability status of the ePDG(s) listed on the PCO, if same is not included to the PCO by the packet data network gateway (PDN-GW 704), or may modify/update the reachability status of the ePDG(s) listed on the PCO prior to forwarding the information to the mobile node (UE 701). The mobile node (UE 701) may skip the DNS request to discover the ePDGs because it has already learned the ePDG IP addresses from the PCO.

The mobile node (UE 701) establishes the radio bearers and sends 908 Attach Complete to mobility management entity (MME 702). When receiving the Attach Complete, the mobility management entity (MME 702) sends 909 an Update Bearer Request message to the serving gateway (S-GW 702) to indicate that downlink packets can be sent and the serving gateway (S-GW 702) acknowledges the message by sending 910 Update Bearer Response message.

Returning to FIG. 7, upon having received (709) information on candidate ePDG(s) in the vicinity of the mobile node (UE 701) and upon having successfully attached to the access network (3GPP access #1), the mobile node (UE 701) has connectivity (710) to the APN respectively PDN indicated in the Attach Request message and can transmit and receive data to/from the PDN (PDN #1). Furthermore, the mobile node (UE 701) may pre-establish (711) a tentative secure tunnel to one of the ePDGs that have been indicated in the PCO of the Attach Response message. In the example illustrated in FIG. 7, the mobile node (UE 701) is pre-establishing a tentative secure tunnel to ePDG 706 within the VPLMN (VPLMN #1) of the roaming partner. The pre-establishment of a tentative secure tunnel to ePDG 706 may be done in response to the Attach Response message or upon the mobile node (UE 701) recognizing its upcoming or potential handover/attachment to an untrusted access. However, the pre-establishment of the tentative secure tunnel is not mandatory, i.e. in some other implementation, the mobile node (UE 701) uses the information on available ePDGs in its vicinity when attaching to an untrusted access as will be explained below in further detail.

Figure 8:
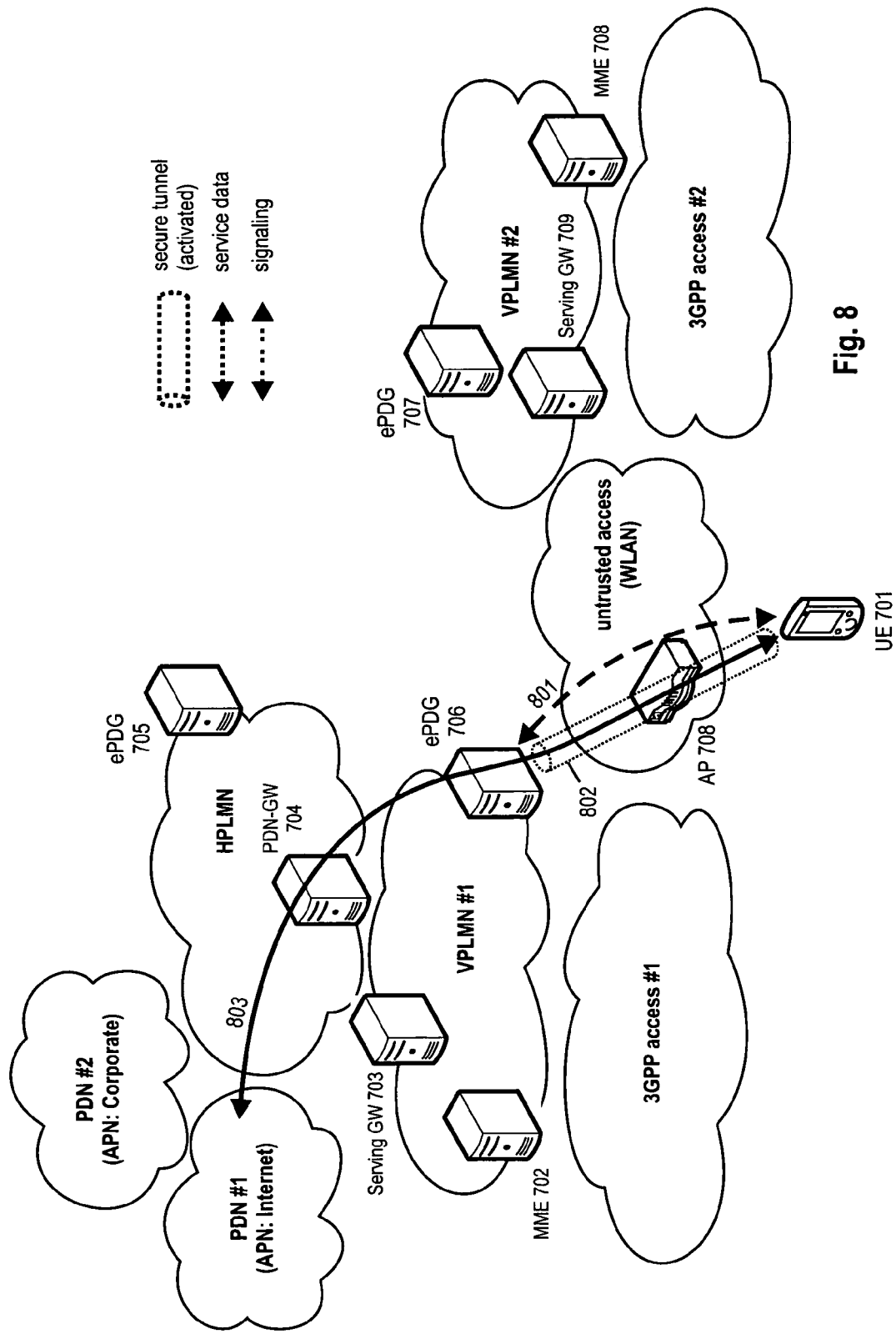

FIG. 8 is illustrating an exemplary scenario according to another embodiment of the invention, how the mobile node may make use of the information on available ePDGs in its vicinity when attaching to an untrusted access. In the illustrated example, it is assumed (see FIG. 7) that the mobile node (UE 701) has pre-established a tentative secure tunnel to ePDG 706. Accordingly, when attaching to the untrusted access network through an access point (AP 708), the mobile node (UE 701) tries to activate (801) the pre-established tentative tunnel. For example, it may be assumed that the IP address of the mobile node (UE 701) has changed when attaching to the untrusted access, so that the security association of the pre-established tentative secure tunnel is bound to the wrong IP address of the mobile node (UE 701). Accordingly, the mobile node (UE 701) may perform some signaling with ePDG 706 to update the security association of the pre-established tentative secure tunnel and to activate the secure tunnel. If the activation of the secure tunnel (802) has been successful, the mobile node (UE 701) can utilize the secure tunnel to ePDG 706 to access (803) to the service (APN: Internet) respectively PDN (PDN #1) previously used through the (trusted) visited PLMN (VPLMN #1) it has been attached to prior to the movement to the untrusted access.

It should be noted that the mobile node (UE 701) could have of course also chosen ePDG 705 in the HPLMN or ePDG 707 in the other visited PLMN (VPLMN #2) and could have connected to the service (APN: Internet) respectively PDN (PDN #1) through those ePDGs as well (given that they support access to the APN/PDN and are reachable through the untrusted access).

In an alternative embodiment of the invention, the mobile node (UE 701) has not pre-established a tentative tunnel to an ePDG prior to attaching to the untrusted access. In this case the mobile node (UE 701) uses the information on the candidate ePDGs learned from the PCO of the Attach Response to establish a secure tunnel to one of the ePDGs upon having obtained IP connectivity to the untrusted access.

Figure 10:
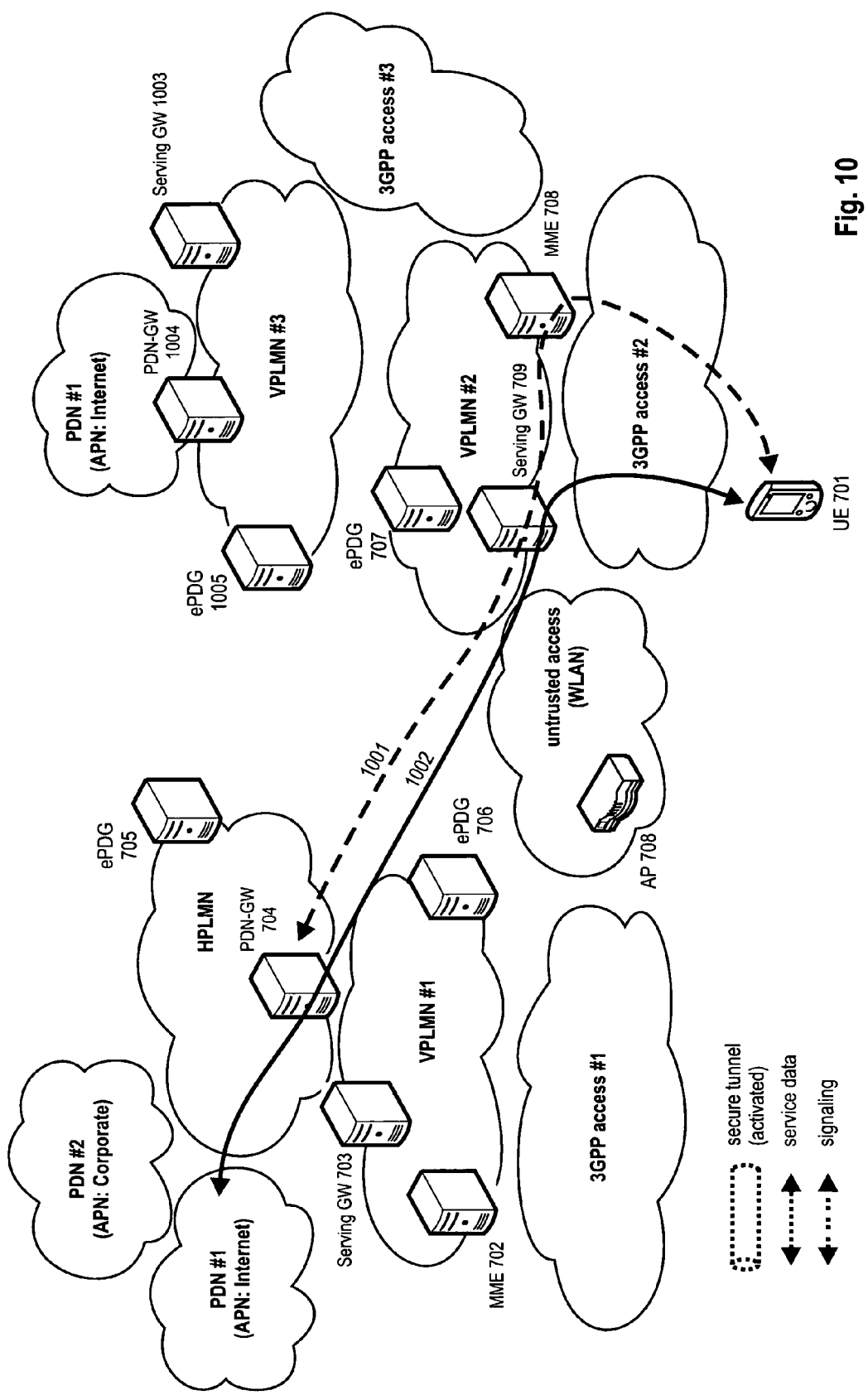
FIG. 10 shows an exemplary communication network and signaling flow according to an embodiment of the invention, where the mobile node is performing a handover to a trusted access network.

Another issue that may occur is that the UE may move to another trusted access and may want to connect to another ePDG because another access may be now in the vicinity of the mobile node. FIG. 10 illustrates a mobile node (UE 701) that is attaching to a 3GPP access (3GPP access #2), for example upon handover from another access network, such as 3GPP access #1. The mobile node (UE 701), discovers the 3GPP access (e.g. by means of the VPLMN ID of VPLMN #2) sends a tracking area update (TAU) to register its current location with the network. Typically the Tracking Area Update Request message is sent to the mobility management entity (MME 708) serving the mobile node (UE 701) in the new PLMN.

As for the initial attach case above, the mobile node (UE 701) may give hints to the PDN-GW by including the PCO of a Tracking Area Update Request message. This PCO information may be different from the PCO in the Attach Request message sent prior to handover (see FIG. 9). The PCO information included to the Tracking Area Update Request message may include the same type of information as the PCO of the Attach Request message discussed above with respect to FIGS. 7, 8 and 9. The mobility management entity (MME 708) forms a Create Bearer Request message that is sent to the serving gateway (S-GW 709) of the visited PLMN (VPLMN #2) and the serving gateway sends an Update Bearer Request message to the packet data network gateway (PDN-GW 704) serving the mobile node (UE 701). Again, based on the PCO information from the mobile node (UE 701), PDN-GW 704 may compile information, such as preferred ePDG IP address (es), or a list of ePDGs that are located in the mobile node's vicinity, that is sent back to the mobile node (UE 701) as PCO included to a Tracking Area Update Accept message provided to the mobile node (UE 701) in response to the Tracking Area Update Request message.

This signaling procedure is exemplarily illustrated in FIG. 10 by arrow 1001. Furthermore, upon the mobile node's movement to another roaming partner's VPLMN (VPLMN #2) the data path is updated so that the data of mobile node (UE 701) is routed via the serving gateway (S-GW 709) to PDN-GW 704 in the HPLMN.

In FIG. 10, as an example, it is assumed that the new VPLMN (VPLMN #2) of the mobile node (UE 701) is neighboring another 3GPP access (3GPP access #3) and VPLMN (VPLMN #3), offering another ePDG 1005 in the mobile node's vicinity. Accordingly, the PDN-GW (PDN-GW 704) compiling the PCO for the mobile node (UE 701) may for example indicate ePDGs 706, 707 and 1005 and their reachability through the current access network (3GPP access #2).

In the previous embodiments discussed above, inter alia the attach procedure and the tracking area update procedure have been used to provide the mobile node with information on trusted packet data gateways in its vicinity and their reachability status, if available. Another option to provide the mobile node with information on trusted packet data gateways in its vicinity according to another embodiment of the invention is the use of DNS. For example the mobile node may detect the ePDGs in its vicinity and their reachability during a DNS request. An exemplary signaling flow of a modified DNS request procedure according to this exemplary embodiment is shown in FIG. 11.

Figure 11:
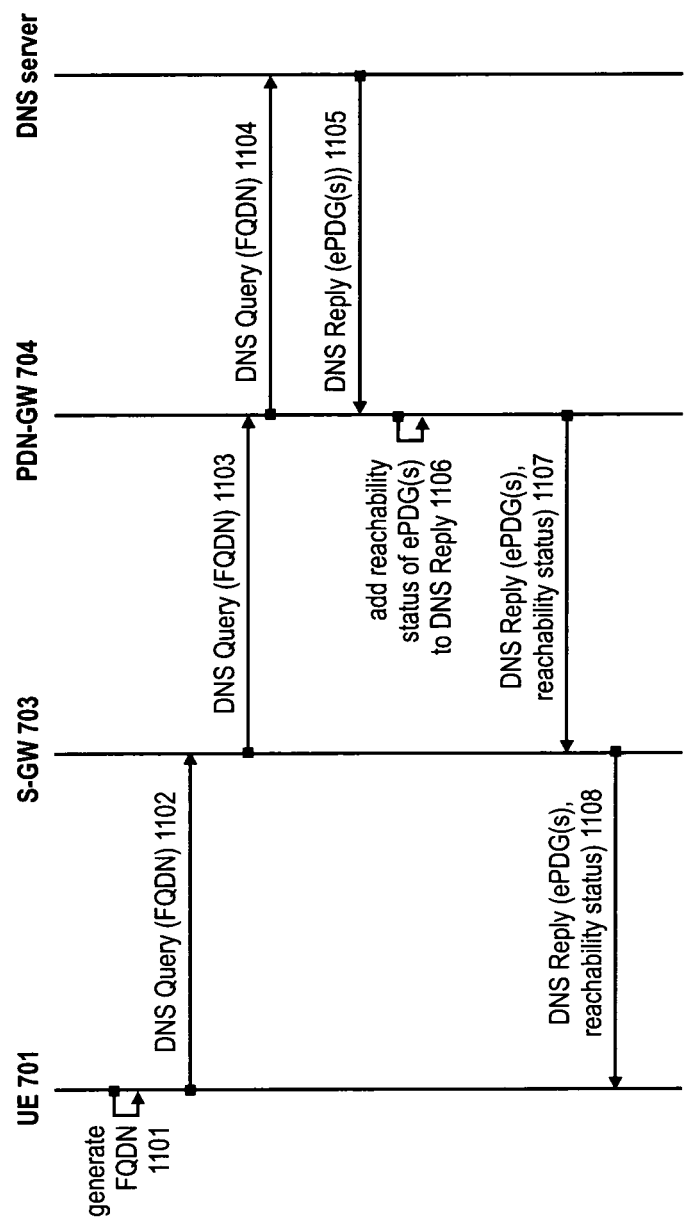
FIG. 11 shows an exemplary message flow according to another embodiment of the invention, where the mobile node uses a DNS query to obtain information on ePDGs in its vicinity.

In FIG. 11 it is exemplarily assumed the mobile node (UE 701) is located in 3GPP access #1 and has established IP connectivity to VPLMN #1. In this exemplary scenario, the mobile node (UE 701) has not received any information on ePDGs in its vicinity during the attach procedure. The mobile node (UE 701) constructs 1101 a FQDN (epdg.vplmn-operator.com) for querying the IP address(es) of ePDG(s) in its vicinity and sends 1102 a DNS query message including the FQDN to the serving gateway (S-GW 703) that is forwarding 1103, 1104 the request via the (PDN#GW 704) to a DNS server. The DNS server compiles a list of ePDGs and returns the compiled information in a DNS reply message sent 1105 to PDN-GW 704. PDN-GW 704 "monitors" the DNS Requests and modifies or filters 1106 the DNS Replies from the DNS server. In the example illustrated in FIG. 11, PDN-GW 704 adds the reachability status of each of the ePDGs listed in the DNS Reply message so as to indicate to the mobile node (UE 701) which of the ePDG(s) are reachable in the current access network (3GPP access #1). Another option may be that the PDN-GW 704 filters the ePDGs listed in the DNS Reply, so that only ePDG(s) reachable the current access network (3GPP access #1) remain in the DNS Reply that is forwarded 1107, 1108 via the serving gateway (S-GW 703) to the mobile node (UE 701).

The PDN-GW may for example know by means of pre-configuration or dynamic learning which ePDGs are reachable from the external PDN the UE is connected to via the PDN-GW. For this the PDN-GW may check the reachability on behalf of the mobile node. When receiving the DNS Reply from the DNS server with a list of ePDG(s) available, the PDN-GW could ping or establish an IKE tunnel to the ePDGs indicated in the DNS Reply so as to check their availability and can subsequently inform the mobile node on the reachability of the ePDGs by means of a modified DNS Reply.

In case of the PDN-GW compiling the information on ePDGs in the vicinity of the mobile node, as described in the examples related to FIGS. 7 to 10 above, the PDN-GW may not know whether the ePDGs are reachable from an external PDN. The PDN-GW may either be preconfigured with the information needed or may actively learn available ePDGs for example by means of a DNS Request and a subsequent check of their reachability. The PDN-GW may for example construct a FQDN for an ePDG discovery and performs the DNS Request as described above. Then, when receiving the SND Reply from the DNS server, the PDN-GW tries to ping or establish an IKE tunnel to the ePDG(s) listed in the DNS Reply and finally informs the mobile node on the ePDGs and their reachability status.

As already indicated in the Technical Background section above, one for the main reasons for the delay in the ePDG connection establishment in an untrusted access is the delay of the ePDG unreachability detection as the mobile node should not conclude that the other endpoint has failed based on any routing information (e.g., ICMP messages). According to another aspect of the invention, another solution is suggested which reduces the delay caused by the ePDG unreachability detection which is using integrity protected ICMP destination unreachable messages that are integrity protected by a trusted entity. In contrast to the requirements in section 2.4 of IETF RFC 4306, the mobile node concludes that the ePDG is not reachable (i.e. without doing any retransmissions) if an integrity protected ICMP destination unreachable message is received when trying to establish a secure tunnel to the ePDG.

It should be noted that this alternative solution may also be combined with the other ideas and concepts of the invention described above. E.g. integrity protected ICMP destination unreachable messages could be also used in combination with the idea of providing the mobile node with ePDG(s) in its vicinity and the reachablility status to avoid unnecessary and time consuming tries to establish secure tunnels to unreachable ePDGs as much as possible.

Figure 12:
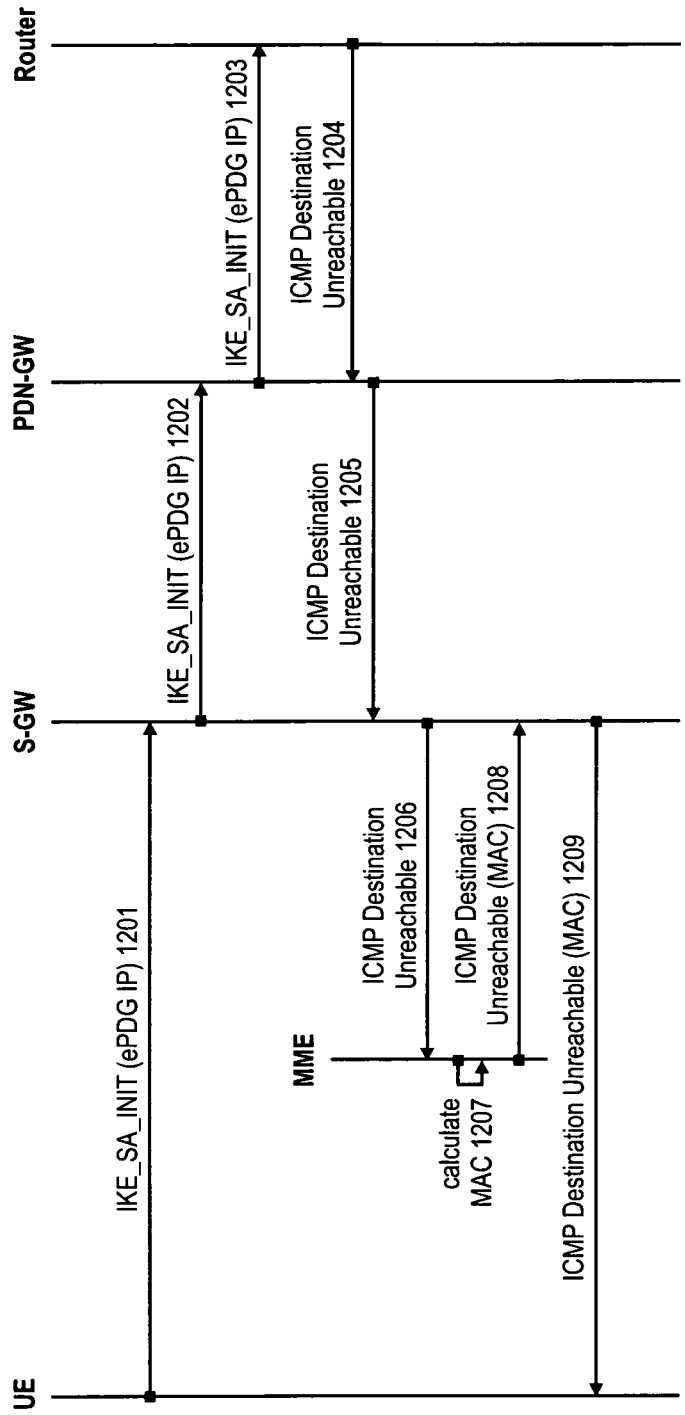
FIG. 12 shows an improved IKE2 signaling flow according to another embodiment of the invention, which is using authenticated ICMP destination unreachable messages.

The use of integrity protected ICMP destination unreachable messages will be explained in further detail with respect to FIG. 12, which is showing an exemplary try of a mobile node to establish a IKE2 security association with an unreachable ePDG. In brief, the mobile node (UE) first sends 1201 an IKE_SA_INIT message to the ePDG triggers an ICMP destination unreachable message e.g. by the PDN network. The IKE_SA_INIT message is routed 1202 from the mobile node via the serving gateway (S_GW) to the PDN-GW. The PDN-GW further routes 1204 the IKE_SA_INIT message to the appropriate PDN according to the route configured in the routing table for the ePDG's external IP address in the IKE_SA_NIT message. As the ePDG cannot be reached through the PDN, a router within the PDN will send 1204 an ICMP destination unreachable message back to the PDN-GW. Further, the PDN-GW is assumed to have a trust relationship with the PDN network and forwards 1205 the ICMP destination unreachable message to the serving gateway (S-GW). The S-GW forwards 1206 the ICMP destination unreachable message to the mobility management entity (MME).

The mobility management entity (MME) calculates 1207 a message authentication code (MAC) using the secret key that is shared with the mobile node (UE) and using the ICMP message. The mobility management entity (MME) integrity protects the ICMP destination unreachable message by including the calculated MAC in the IP header (e.g. the flow ID field) of the ICMP destination unreachable message and forwards 1208 the message back to the serving gateway (S-GW). The serving gateway (S-GW) forwards 1209 the message to the mobile node (UE). The mobile node (UE) can immediately conclude that the ePDG is not reachable without doing any retransmissions based on the ICMP destination unreachable message that is including the MAC for integrity protection.

Next, some further considerations regarding the mechanisms using the PCO described above will be provided in the following. Generally, the inclusion and use of PCO to signalling messages is only possible, if the access network supports transfer of such parameters. This is assumed in the above exemplary embodiments of the invention. However, in non-3GPP based access networks, this might not always be the case. For example, in case of an initial attach or handover attach from non-3GPP accesses, the transfer of PCO may not be supported.

In one exemplary embodiment of the invention, DHCP is used instead of PCO to request reachable ePDGs. For example, the mobile node sends a DHCP Request message to a DHCP server and requests ePDG information in a DHCP Option of the DHCP message. The option may include the same parameters as described for the PCO above, for example APN or FQDN or IP address of the ePDG the mobile node intends to use. Based on this information provided by the mobile node the DHCP server may compile information to be sent back to the mobile node in an DHCP Reply message, e.g. preferred ePDG IP address(es), or a list of ePDGs that are located in the mobile node's vicinity.

In another embodiment of the invention, it is suggested that, in case of initial attach to an untrusted non-3GPP access and in case of initial attach from an trusted or untrusted non-3GPP access with Client Mobile IP (CMIP), the IKE informational exchange can be used to inform the mobile node about the reachability of other ePDGs from a given PDN connection, in a similar manner as with the use of PCO. In case of initial attach to trusted non-3GPP access and Proxy Mobile IP (PMIP), the AAA signalling can be modified, for example by EAP extension or specific temporary identifiers, to carry the desired additional information. Another possibility is that the additional information of the PCO is encoded in IPv6 prefix(es) and the prefix(es) is advertised in the trusted non-3GPP access with lifetime 0, so that it can not be used by the UE for any session.

Figure 13:
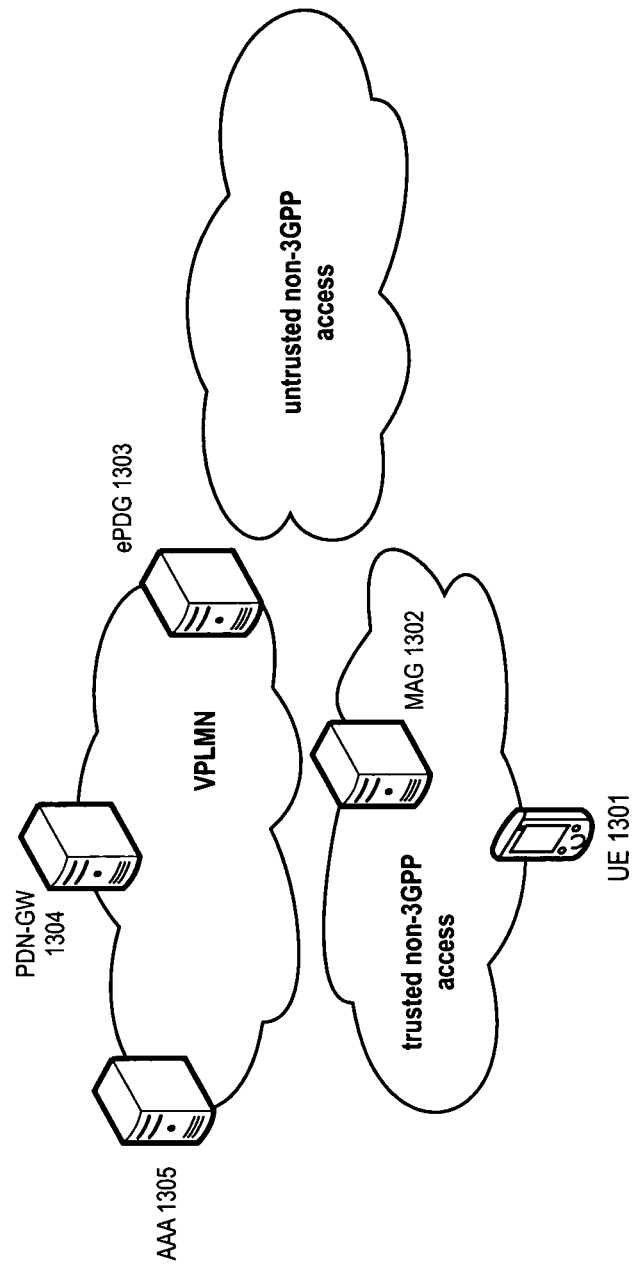
FIG. 13 shows an exemplary communication network according to an embodiment of the invention, where PMIP is offered to the mobile node.
Figure 14:
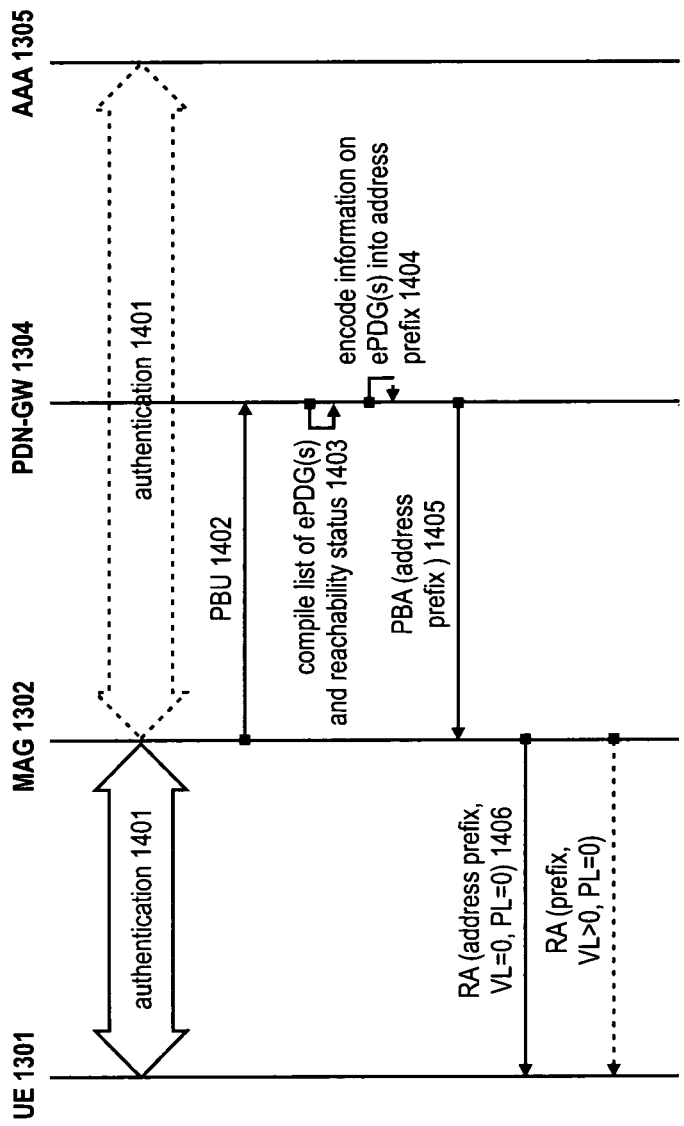
FIG. 14 shows an exemplary message flow in the communication network of FIG. 14 according to another embodiment of the invention, where the mobile node is provided with information on ePDGs located in its vicinity by a mobile access gateway.

An exemplary implementation is discussed in the following with respect to FIG. 13. In FIG. 13, it is assumed that PMIP is utilized in the trusted non-3GPP access network. Accordingly, the mobile access gateway (MAG) of PMIP is located in the trusted non-3GPP access network. The PDN-GW in the PLMN is assumed to implement the function of the Local Mobility Anchor (LMA) of PMIP. The message flow in the network shown in FIG. 13 is explained in further detail with respect to FIG. 14. During the access authentication procedure 1401 in the trusted non-3GPP access, the mobile node 1301 may indicate ePDG tunnel pre-establishment, e.g. via a modified user identity (for example a decorated NAI like "user@realm!ePDGrequest" is used). The MAG 1302 sends 1402 an indication that a list of ePDGs is desired in the proxy binding update (PBU) to PDN-GW 1304. PDN-GW 1304 compiles 1403 the information for the mobile node 1301 (e.g. preferred ePDG, IP address(es), ePDG reachablity status), encodes 1404 the information into IPv6 prefix(es) and sends 1405 them in a Proxy Binding Acknowledgement (PBA) back to MAG 1302. The MAG 1302 sends 1406 a Router Advertisement (RA) to the mobile node 1301 on the point-to-point link that informs the mobile node 1301 on the IPv6 prefix(es). If the Prefix Information in the Router Advertisement has Valid Lifetime (VL)>0, it includes an IP prefix that can be used by the mobile node 1301 for sessions. If the Prefix Information in the Router Advertisement has on the other hand a Valid Lifetime (VL)=0 (and Prefix Length (PL)=0), it includes the requested encoded information about the ePDG reachability.

The description of the various embodiments of the invention has mainly focused on the aspect of how the mobile node can be informed on trusted packet data gateways in its vicinity or how the mobile node can obtain and maintain such information. For more details on procedures how to establish or pre-establish a secure tunnel to a trusted packet data gateway, e.g. ePDG, how to pre-establish a tentative secure tunnel to a trusted packet data gateway and how to activate such tentative secure tunnel, it is referred to our co-pending application no. EP 08016714.1, "Optimization of Handovers to untrusted non-3GPP networks", which is incorporated herein by reference.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the embodiments have been outlined in relation to a 3GPP-based communication system and the terminology used in the previous sections mainly relates to the 3GPP terminology. However, the terminology and the description of the various embodiments with respect to 3GPP-based architectures are not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for establishing a secure tunnel to a trusted packet data gateway upon a mobile node initially attaching to or performing a handover to a target access network, the method comprising:
determining from a reachability list maintained in the mobile node at least one trusted packet data gateway that is reachable through the target access network, wherein the reachability list lists data sets indicating data paths and the reachability status of respective known trusted packet data gateways for each respective data path, and
establishing a secure tunnel to the trusted packet data gateway determined from the reachability list maintained in the mobile node, the secure tunnel is established prior to the attachment to the target access network.

2. The method according to claim 1, wherein the data paths are indicated by
combinations of access network identifiers, core network identifiers and access point names, or
combinations of core network identifiers and access point names, or
access point names.

3. The method according to claim 2, further comprising trying, upon the mobile node having attached to the target access network, to establish a secure tunnel to a trusted packet data gateway pre-configured in the mobile node or learned from a DNS query, in case no access point name of a packet data network through which a trusted packet data gateway can be reached could be determined from the reachability list.

4. The method according to claim 3, further comprising adding to the reachability list a data set indicating the data path to said unreachable trusted packet data gateway and that the unreachable trusted packet data gateway is not reachable through the data path, in case no secure tunnel can be established to a trusted packet data gateway due to the trusted packet data gateway being unreachable.

5. The method according to claim 3, further comprising adding to the reachability list a data set indicating the data path to said reachable trusted packet data gateway and that the reachable trusted packet data gateway is reachable through the data path, in case a secure tunnel can be established to a trusted packet data gateway.

6. The method according to claim 4, further comprising adding to the reachability list a data set indicating the data path to said reachable trusted packet data gateway and that the reachable trusted packet data gateway is reachable through the data path, in case a secure tunnel can be established to a trusted packet data gateway.

7. The method according to claim 1, further comprising updating the reachability list, if the reachability status of a trusted packet data gateway changes for a given data path.

8. The method according to claim 2, further comprising updating the reachability list, if the reachability status of a trusted packet data gateway changes for a given data path.

9. The method according to claim 1, further comprising:
receiving a reachability list from another mobile node or network node in the access network or core network connected thereto.

10. The method according to claim 2, further comprising:
receiving a reachability list from another mobile node or network node in the access network or core network connected thereto.

11. The method according to claim 9, further comprising updating the maintained reachability list based on the reachability list received from another mobile node or network node in the access network or core network connected thereto.

12. The method according to claim 10, further comprising updating the maintained reachability list based on the reachability list received from another mobile node or network node in the access network or core network connected thereto.

13. The method according to claim 1, wherein the reachability list consists of two list, a white list listing the data paths of trusted packet data gateway being reachable through the respective data path and the respective of trusted packet data gateway and a black list listing the data paths of trusted packet data gateway not being reachable through the respective data path and the respective of trusted packet data gateway.

14. The method according to claim 2, wherein the reachability list consists of two list, a white list listing the data paths of trusted packet data gateway being reachable through the respective data path and the respective of trusted packet data gateway and a black list listing the data paths of trusted packet data gateway not being reachable through the respective data path and the respective of trusted packet data gateway.

15. The method according to one of claim 1, wherein the steps of the method are performed by the mobile node only in case the IP address configured on a mobile node's interface to the target access network is differing from the IP address configured on a mobile node's interface to the source access network, or in case the a trusted packet data gateway to which the mobile node has established a tunnel through the source access network is not reachable through the target access network according to the reachability list.

16. A method for establishing a secure tunnel to a trusted packet data gateway, the method comprising the steps:
establishing a secure tunnel to the trusted packet data gateway through a source access gateway and via a packet data network gateway prior to handover to a target access network,
checking prior to attachment to the target access network whether the trusted packet data gateway can be reached through the target access network by checking reachability status of the trusted packet data gateway through the target access network based on a reachability list maintained by the mobile node, wherein the reachability list lists data sets indicating data paths and the reachability status of respective known trusted packet data gateways for each respective data path, and
requesting via the source access network the core network node of a core network connected to the source access network to maintain the connection to the trusted packet data gateway via the packet data network gateway upon the mobile node attaching to the target access network.

17. The method according to claim 16, further comprising performing the following steps, in case the trusted packet data gateway cannot be reached through the target access network:
determining from a reachability list maintained in the mobile node at least one trusted packet data gateway that is reachable through the target access network, wherein the reachability list lists data sets indicating data paths and the reachability status of respective known trusted packet data gateways for each respective data path, and
establishing a secure tunnel to the trusted packet data gateway determined from the reachability list maintained in the mobile node.

18. The method according to claim 17, wherein the data paths are indicated by
combinations of access network identifiers, core network identifiers and access point names, or
combinations of core network identifiers and access point names, or
access point names.

19. The method according to claim 18, further comprising trying, upon the mobile node having attached to the target access network, to establish a secure tunnel to a trusted packet data gateway pre-configured in the mobile node or learned from a DNS query, in case no access point name of a packet data network through which a trusted packet data gateway can be reached could be determined from the reachability list.

20. The method according to claim 19, further comprising adding to the reachability list a data set indicating the data path to said unreachable trusted packet data gateway and that the unreachable trusted packet data gateway is not reachable through the data path, in case no secure tunnel can be established to a trusted packet data gateway due to the trusted packet data gateway being unreachable.

21. The method according to claim 17, further comprising receiving a reachability list from another mobile node or network node in the access network or core network connected thereto.

22. The method according to claim 21, further comprising updating the maintained reachability list based on the reachability list received from another mobile node or network node in the access network or core network connected thereto.

23. The method according to claim 17, wherein the reachability list consists of two list, a white list listing the data paths of trusted packet data gateway being reachable through the respective data path and the respective of trusted packet data gateway and a black list listing the data paths of trusted packet data gateway not being reachable through the respective data path and the respective of trusted packet data gateway.

24. The method according to claim 18, wherein the reachability list consists of two list, a white list listing the data paths of trusted packet data gateway being reachable through the respective data path and the respective of trusted packet data gateway and a black list listing the data paths of trusted packet data gateway not being reachable through the respective data path and the respective of trusted packet data gateway.

25. A mobile node comprising:
a processing unit configured to determine from a reachability list maintained in the mobile node at least one trusted packet data gateway that is reachable through the target access network, wherein the reachability list lists data sets indicating data paths and the reachability status of respective known trusted packet data gateways for each respective data path, and
a communication unit configured to establish a secure tunnel to the trusted packet data gateway, determined from the reachability list maintained in the mobile node, wherein the secure tunnel is established prior to the attachment to the target access network.

26. A mobile node comprising:
a communication unit configured to establish a secure tunnel to the trusted packet data gateway through a source access gateway and via a packet data network gateway prior to handover to a target access network, and
a processing unit configured to check prior to attachment to the target access network whether the trusted packet data gateway can be reached through the target access network by checking reachability status of the trusted packet data gateway through the target access network based on a reachability list maintained by the mobile node, wherein the reachability list lists data sets indicating data paths and the reachability status of respective known trusted packet data gateways for each respective data path,
wherein the communication unit is configured to request via the source access network the core network node of a core network connected to the source access network to maintain the connection to the trusted packet data gateway via the packet data network gateway upon the mobile node attaching to the target access network.

* * * * *